(12) United States Patent
Freudiger et al.

(10) Patent No.: US 10,666,628 B2
(45) Date of Patent: May 26, 2020

(54) SECURE AUTHENTICATION OF DEVICE IDENTIFICATION FOR LOW THROUGHPUT DEVICE TO-DEVICE WIRELESS COMMUNICATION

(71) Applicant: Apple Inc., Cupertino, CA (US)

(72) Inventors: Julien F. Freudiger, San Francisco, CA (US); Andrew J. Ringer, Santa Cruz, CA (US); Yannick L. Sierra, San Francisco, CA (US); Farouk Belghoul, Campbell, CA (US); Samuel D. Post, Great Falls, MT (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/055,892

(22) Filed: Aug. 6, 2018

(65) Prior Publication Data

US 2019/0044930 A1 Feb. 7, 2019

Related U.S. Application Data

(60) Provisional application No. 62/541,137, filed on Aug. 4, 2017, provisional application No. 62/619,105, filed on Jan. 18, 2018.

(51) Int. Cl.
| | |
|---|---|
| *H04L 29/06* | (2006.01) |
| *H04W 12/06* | (2009.01) |
| *H04W 76/14* | (2018.01) |
| *H04W 12/04* | (2009.01) |
| *H04L 9/06* | (2006.01) |
| *H04L 9/08* | (2006.01) |
| *H04L 9/32* | (2006.01) |
| *H04L 9/16* | (2006.01) |
| *H04W 12/00* | (2009.01) |

(52) U.S. Cl.
CPC ......... *H04L 63/067* (2013.01); *H04L 9/0643* (2013.01); *H04L 9/0838* (2013.01); *H04L 9/16* (2013.01); *H04L 9/3226* (2013.01); *H04L 9/3239* (2013.01); *H04L 9/3297* (2013.01); *H04L 63/0876* (2013.01); *H04W 12/003* (2019.01); *H04W 12/04* (2013.01); *H04W 12/06* (2013.01); *H04W 76/14* (2018.02); *H04L 2209/805* (2013.01)

(58) Field of Classification Search
CPC ... H04L 63/067; H04L 9/0838; H04L 12/003; H04L 9/16; H04L 9/3226; H04L 9/3297; H04L 9/3239; H04L 63/0876; H04L 9/0643; H04L 2209/805; H04W 76/14; H04W 12/04; H04W 12/06; H04W 2209/805
USPC ........................................................ 455/411
See application file for complete search history.

(56) References Cited

U.S. PATENT DOCUMENTS

| | | | | |
|---|---|---|---|---|
| 8,719,573 | B2 * | 5/2014 | Ran .................. | H04L 9/0861 713/170 |
| 2007/0249324 | A1 * | 10/2007 | Jou .................. | H04L 63/06 455/411 |
| 2012/0128154 | A1 * | 5/2012 | Ran .................. | H04K 1/00 380/255 |

(Continued)

*Primary Examiner* — Julio R Perez

(74) *Attorney, Agent, or Firm* — Van Court & Aldridge LLP

(57) ABSTRACT

Systems, methods, and computer-readable media may be provided for securely authenticating device identification and/or user identification for low throughput device-to-device wireless communication.

27 Claims, 13 Drawing Sheets

(56) References Cited

U.S. PATENT DOCUMENTS

| | | | | |
|---|---|---|---|---|
| 2013/0122864 A1* | 5/2013 | Haggerty | ............... | H04L 63/105 |
| | | | | 455/411 |
| 2014/0024343 A1* | 1/2014 | Bradley | ................. | H04W 4/70 |
| | | | | 455/411 |
| 2015/0126153 A1* | 5/2015 | Spitz | ..................... | H04M 1/675 |
| | | | | 455/411 |
| 2016/0029198 A1* | 1/2016 | Prats | ..................... | H04W 8/005 |
| | | | | 455/41.2 |
| 2017/0048671 A1* | 2/2017 | Marri Sridhar | ....... | H04L 5/0055 |

* cited by examiner

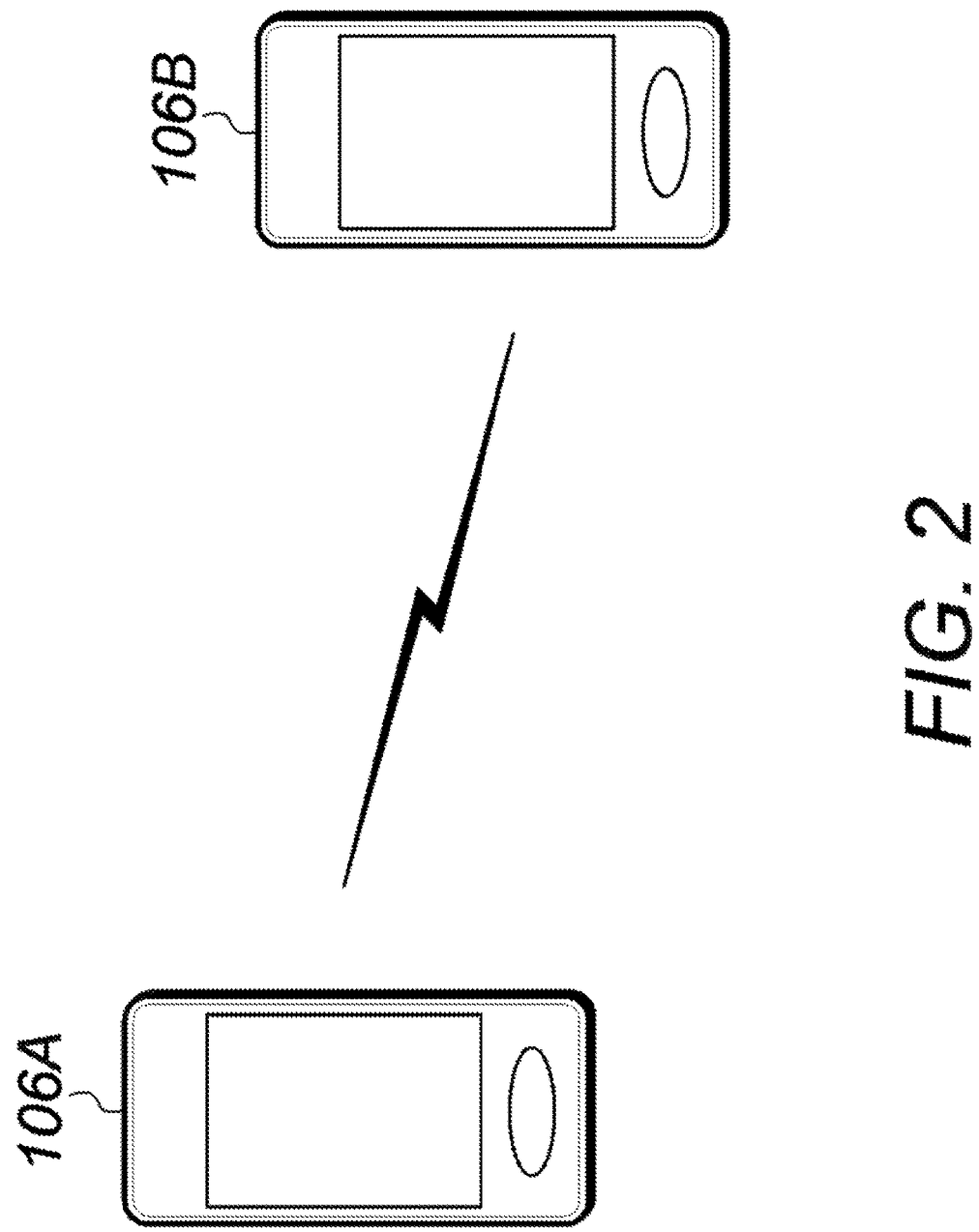

SECURE AUTHENTICATION OF DEVICE IDENTIFICATION FOR LOW THROUGHPUT DEVICE TO-DEVICE WIRELESS COMMUNICATION

CROSS-REFERENCE TO RELATED APPLICATION(S)

This application claims the benefit of prior filed U.S. Provisional Patent Application No. 62/541,137, filed Aug. 4, 2017, and U.S. Provisional Patent Application No. 62/619,105, filed Jan. 18, 2018, each of which is hereby incorporated by reference herein in its entirety.

TECHNICAL FIELD

This disclosure relates to wireless communication and, more particularly, to techniques for securely authenticating device identification and/or user identification for low throughput device-to-device wireless communication.

BACKGROUND OF THE DISCLOSURE

Wireless communication systems are rapidly growing in usage. Further, wireless communication technology has evolved from voice-only communications to include the transmission of data, such as Internet and multimedia content. Mobile electronic devices may take the form of smart telephones or tablets that a user typically carries. Wearable devices, also referred to as accessory devices, are a newer form of mobile electronic device, one example being smart watches. Additionally, low-cost low-complexity wireless devices intended for stationary or nomadic deployment are also proliferating as part of the developing "Internet of Things". In other words, there is an increasingly wide range of desired device complexities, capabilities, traffic patterns, and other characteristics. In general, it would be desirable to recognize and provide improved support for a broad range of desired wireless communication characteristics. Therefore, improvements in the field are desired.

SUMMARY OF THE DISCLOSURE

This document describes systems, methods, and computer-readable media for securely authenticating device identification and/or user identification for low throughput device-to-device wireless communication.

As noted above, the number of use cases for different classes of wireless devices with widely variable capabilities and usage expectations are growing. While many wireless communication systems primarily utilize infrastructure mode type communications (e.g., in which one or more base stations and potentially a supporting network may be used as intermediaries between endpoint devices), one possible use case for wireless communication includes direct device-to-device communications. This disclosure presents various techniques for supporting such communications. Among the features and techniques described herein are techniques for securely authenticating device identification and/or user identification (device/user identification) for low throughput device-to-device wireless communication, such as by using a reduced length device identification discovery advertisement that may only be viable for a particular duration of time to securely authenticate the identity of one device by another device for low throughput device-to-device wireless communication. The techniques described herein may be implemented in and/or used with a number of different types of devices, including, but not limited to, cellular phones, tablet computers, accessory and/or wearable computing devices, portable media players, cellular base stations and other cellular network infrastructure equipment, servers, and any of various other computing devices.

As an example, a method of securing device authentication for communication between a first electronic device and a second electronic device may be provided that includes pairing the first electronic device and the second electronic device for a pairing session of a limited duration, wherein the pairing includes enabling a shared secret between the first electronic device and the second electronic device for the pairing session, time synchronizing the first electronic device and the second electronic device for at least the limited duration of the pairing session, and, during the limited duration of the pairing session, generating, at the first electronic device, an identification discovery advertisement using the shared secret, transmitting, from the first electronic device, the identification discovery advertisement, receiving, at the second electronic device, the identification discovery advertisement, and authenticating, at the second electronic device, the identification discovery advertisement using the shared secret.

As another example, a method of securing device authentication for communication between a first electronic device and a second electronic device may be provided that includes pairing the first electronic device and the second electronic device for a pairing session of a limited duration, wherein the pairing includes enabling a shared secret between the first electronic device and the second electronic device for the pairing session, time synchronizing the first electronic device and the second electronic device for at least the limited duration of the pairing session, and, during the limited duration of the pairing session, generating, at the first electronic device, an identification discovery advertisement using the shared secret, and transmitting, from the first electronic device, the identification discovery advertisement, wherein the generating the identification discovery advertisement includes, at a current time of the generating, identifying a key of the shared secret that is associated with the current time of the generating, obtaining a random value, encrypting at least a portion of the identified key using the obtained random value to provide an encrypted key, and defining the identification discovery advertisement to include the obtained random value and the encrypted key.

As yet another example, a method of securing device authentication for communication between a first electronic device and a second electronic device may be provided that includes pairing the first electronic device and the second electronic device for a pairing session of a limited duration, wherein the pairing includes enabling a shared secret between the first electronic device and the second electronic device for the pairing session, time synchronizing the first electronic device and the second electronic device for at least the limited duration of the pairing session, and, during the limited duration of the pairing session, receiving, at the second electronic device, an identification discovery advertisement including a random value and an encrypted key, and authenticating, at the second electronic device, the identification discovery advertisement using the shared secret, wherein the authenticating the identification discovery advertisement includes, at a current time of the receiving, identifying a key of the shared secret that is associated with the current time of the receiving, obtaining the random value from the identification discovery advertisement, encrypting at least a portion of the identified key using the obtained random value to provide an other encrypted key, and validating the identification discovery advertisement when the other encrypted key matches the encrypted key from the identification discovery advertisement.

This Summary is provided only to present some example embodiments, so as to provide a basic understanding of some aspects of the subject matter described in this document. Accordingly, it will be appreciated that the features described in this Summary are only examples and should not be construed to narrow the scope or spirit of the subject matter described herein in any way. Unless otherwise stated, features described in the context of one example may be combined or used with features described in the context of one or more other examples. Other features, aspects, and advantages of the subject matter described herein will become apparent from the following Detailed Description, FIGS., and Claims.

BRIEF DESCRIPTION OF THE DRAWINGS

The discussion below makes reference to the following drawings, in which like reference characters refer to like parts throughout, and in which:

FIG. 2 illustrates an example wireless communication system in which two wireless devices can perform direct device-to-device communication, according to some embodiments;

DETAILED DESCRIPTION OF THE DISCLOSURE

Figure 1:
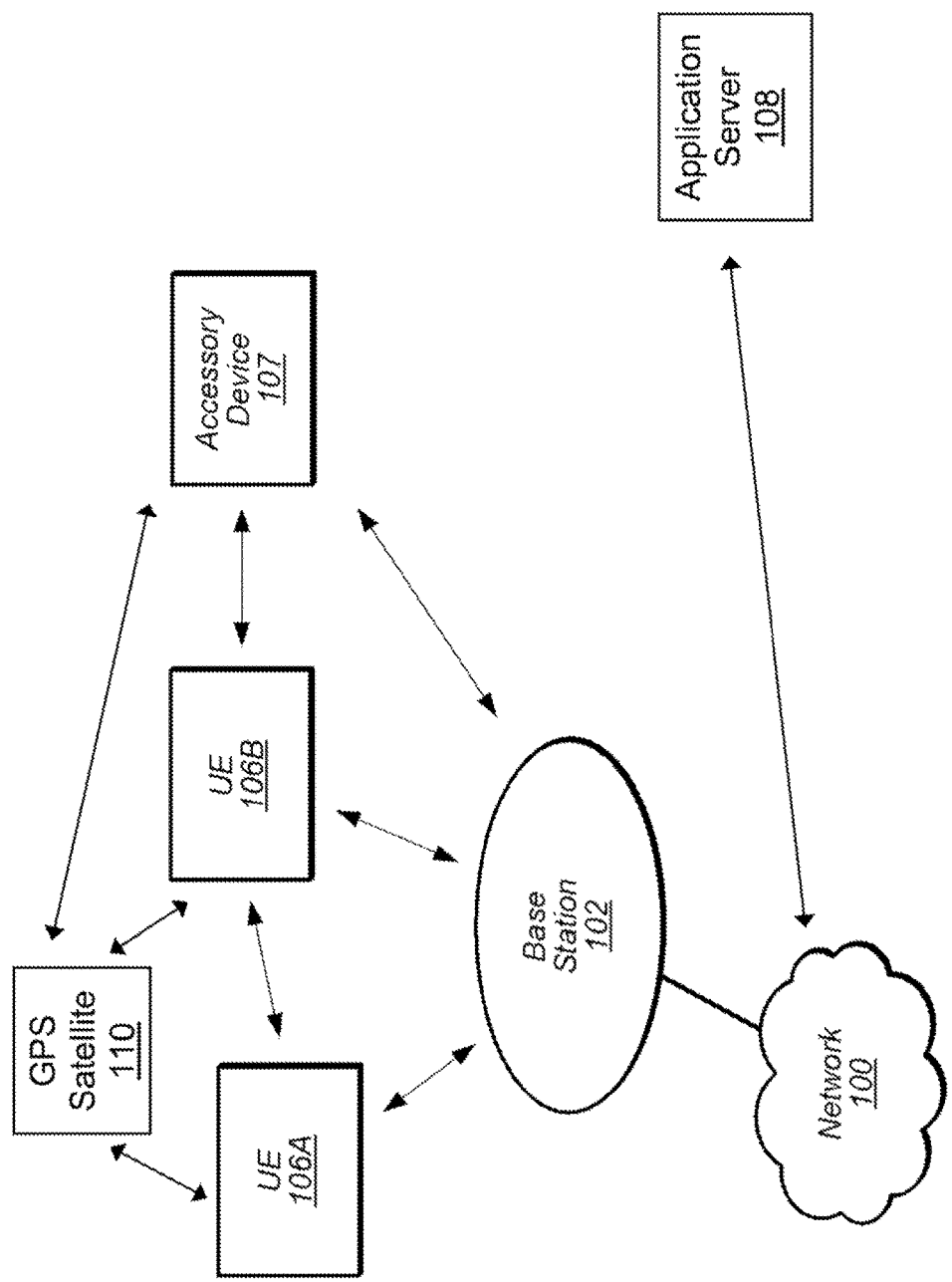
FIG. 1 illustrates an example wireless communication system including an accessory device, according to some embodiments.

Systems, methods, and computer-readable media may be provided for securely authenticating device identification and/or user identification for low throughput device-to-device wireless communication. At least two user devices may be paired for enabling certain secure authentication. For example, during a pairing process, any suitable shared secret, such as at least one set of symmetric keys, may be shared between two particular user devices. In some embodiments, a shared secret may be associated with a particular pairing session (pairing period) of any suitable duration, whereby the shared secret may only be viable during that pairing session. A pairing process may also be operative to ensure that a particular communication protocol is shared between the devices being paired. For example, one or more particular key derivation functions, one or more particular cryptographic hash functions, device-to-device protocols, and/or any other suitable protocol data may be shared or ensured to be common between the two devices such that each device may be operative to securely authenticate the other during device-to-device wireless communications. Prior to any such pairing, concurrently with any such pairing, and/or after any such pairing, the two devices may be time synchronized with one another using any suitable time synchronization mechanism(s) or process(es). For example, during such a synchronization process, any suitable measures may be taken to ensure that the two devices have the same notion of time, which may include determining that the two devices have reliable internal clocks (e.g., which may or may not be susceptible to drift) and/or synchronizing each device's clock to a clock of a reliable master device or any suitable remote source of data (e.g., a GPS satellite). Once at least two devices have been paired and time synchronized, a first of the at least two devices may generate and transmit an identification discovery advertisement (IDA) from the first device. The IDA may be uniquely generated based on a shared secret available to the first device (e.g., as made available during the pairing process) and may be further uniquely generated based on a pairing session associated with the pairing process, and, in some embodiments, may be further uniquely generated based on a particular rotation session (e.g., rotation period) of a number of rotation sessions of such a pairing session, where such a particular rotation session may be associated with the current time at which the IDA is generated and/or transmitted. Then, at least one second device of the at least two devices may receive and authenticate the IDA from the first device. Such authentication of the IDA may be uniquely carried out based on a shared secret available to the second device (e.g., as made available during the pairing process between the first and second devices and/or as used during the generation of the IDA) and may be further uniquely carried out during the pairing session associated with the pairing process, and, in some embodiments, may be further uniquely carried out based on a particular rotation session of such a pairing session, where such a particular rotation session may be associated with the current time at which the IDA is received and/or authenticated. By generating an IDA that may be uniquely based on a particular shared secret of a particular pairing session and/or based on a particular rotation session of the particular pairing session, the size of the IDA may be reduced while facilitating a robust amount of privacy. That is, despite a short IDA being susceptible to being repeatedly generated at a particular frequency, because each rotation session and each pairing session may only be functional or viable for a limited amount of time, the viable duration of such session(s) may be defined so as to avoid a particular amount of risk or lack of security that may otherwise be presented due to the repeatability susceptibility of the small IDA. The two devices may be re-paired before the end of a particular pairing session such that a shared secret (e.g., one or more symmetrical key sets) may be rotated or refreshed or updated for a new pairing session. An authenticated IDA may be used as at least a portion of a media access control address (MAC address) of one of the devices for use in future data communications between the two devices (e.g., during the remainder of the associated rotation session or pairing session). Therefore, such use of an IDA may be operative to minimize or otherwise reduce overhead when securely authenticating peer-to-peer (P2P) devices. Such generation and/or such authentication using an IDA may be handled exclusively or substantially or at least partially at a particular layer (e.g., using a protocol layer in the device-to-device (D2D) protocol stack, such as the packet data convergence control protocol/non-access stratum (PDCP/NAS) security over MAC layer, and/or physical layer (PHY layer) (e.g., on a cellular baseband or modem side or domain)) rather than at another (higher) particular layer of the protocol stack (e.g., the application layer (e.g., on an application processor side or domain)). Because certain wireless communication standards, such as off grid radio service (OGRS), may utilize relatively little bandwidth and provide relatively little throughput, it may be correspondingly more useful to reduce the throughput or overhead of over-the-air signaling of such an IDA between devices and/or to avoid or reduce the use of higher layer functionality layers of one or both devices during such identification authentication. This may allow the wireless device to reduce the over-the-air signaling burden on the D2D link (e.g., since a reduced length IDA may be used for frequent device advertisement). This may be particularly helpful for D2D links with relatively low bandwidth and/or throughput capability, for which such potentially large IDAs may have a substantial impact on the ability of the devices using those links to communicate data with each other.

Acronyms

The following acronyms are used in the present disclosure.

3GPP: Third Generation Partnership Project
3GPP2: Third Generation Partnership Project 2
GSM: Global System for Mobile Communications
UMTS: Universal Mobile Telecommunications System
LTE: Long Term Evolution
OGRS: Off Grid Radio Service
IoT: Internet of Things
NB: Narrowband
D2D: device-to-device
OOC: out-of-coverage Terminology The following are definitions of terms used in this disclosure:

Memory Medium—Any of various types of non-transitory memory devices or storage devices. The term "memory medium" is intended to include an installation medium (e.g., a CD-ROM, floppy disks, or tape device; a computer system memory or random access memory such as DRAM, DDR RAM, SRAM, EDO RAM, Rambus RAM, etc.); a non-volatile memory such as a Flash, magnetic media (e.g., a hard drive, or optical storage; registers, or other similar types of memory elements, etc.). The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations (e.g., in different computer systems that may be connected over a network). The memory medium may store program instructions (e.g., embodied as computer programs) that may be executed by one or more processors.

Carrier Medium—a memory medium as described above, as well as a physical transmission medium, such as a bus, network, and/or other physical transmission medium that may convey signals, such as electrical, electromagnetic, or digital signals.

Programmable Hardware Element—includes various hardware devices, such as multiple programmable function blocks connected via a programmable interconnect. Examples may include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DSTM, PlayStation Portable™, Gameboy Advance™, iPhone™), laptops, wearable devices (e.g., smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which may be easily transported by a user and capable of wireless communication.

Wireless Device—any of various types of computer system devices which performs wireless communications. A wireless device can be portable (or mobile) or may be stationary or fixed at a certain location. A UE may be an example of a wireless device.

Communication Device—any of various types of computer systems or devices that perform communications, where the communications can be wired or wireless. A communication device can be portable (or mobile) or may be stationary or fixed at a certain location. A wireless device may be an example of a communication device. A UE may be another example of a communication device.

Base Station—The term "Base Station" (also called "eNB") has the full breadth of its ordinary meaning, and at least may include a wireless communication station installed at a fixed location and used to communicate as part of a wireless cellular communication system.

Link Budget Limited—includes the full breadth of its ordinary meaning, and at least includes a characteristic of a wireless device (e.g., a UE) which exhibits limited communication capabilities, or limited power, relative to a device that is not link budget limited, or relative to devices for which a radio access technology (RAT) standard has been developed. A wireless device that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, may be generally link budget limited devices. Alternatively, a device may not be inherently link budget limited (e.g., may have sufficient size, battery power, and/or transmit/receive power for normal communications over LTE or LTE-A), but may be temporarily link budget limited due to current communication conditions (e.g., a smart phone being at the edge of a cell, etc.). It is noted that the term "link budget limited" may include or encompass power limitations, and thus a power limited device may be considered a link budget limited device.

Processing Element (or Processor)—refers to various elements or combinations of elements. Processing elements include, for example, circuits, such as an ASIC (Application Specific Integrated Circuit), portions or circuits of individual processor cores, entire processor cores, individual processors, programmable hardware devices, such as a field programmable gate array (FPGA), and/or larger portions of systems that may include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" may be in contrast to an operation being manually performed or specified by the user, where the user provides input to directly perform the operation. An automatic procedure may be initiated by input provided by the user, but the subsequent actions that are performed "automatically" are not specified by the user (i.e., are not performed "manually"), where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

FIGS. 1 and 2—Wireless Communication System

FIG. 1 illustrates an example of a wireless cellular communication system. It is noted that FIG. 1 represents one possibility among many, and that features of the present disclosure may be implemented in any of various systems, as desired. For example, embodiments described herein may be implemented in any type of wireless device.

As shown, the exemplary wireless communication system includes a cellular base station 102, which may communicate over a transmission medium with one or more wireless devices 106A, 106B, and/or the like, as well as accessory device 107. Wireless devices 106A, 106B, and 107 may be user devices, which may be referred to herein as "user equipment" (UE) or UE devices.

The base station 102 may be a base transceiver station (BTS) or cell site, and may include hardware that enables wireless communication with the UE devices 106A, 106B, and 107. The base station 102 may also be equipped to communicate with a network 100 (e.g., a core network of a cellular service provider, a telecommunication network, such as a public switched telephone network (PSTN), and/or the Internet, among various possibilities). Thus, the base station 102 may facilitate communication among the UE devices 106 and 107 and/or between the UE devices 106 and 107 and the network 100. In other implementations, base station 102 can be configured to provide communications over one or more other wireless technologies, such as an access point supporting one or more WLAN protocols, such as 802.11 a, b, g, n, ac, ad, and/or ax, or LTE in an unlicensed band (LAA). An application server 108 may be communicatively coupled to one or more of the UE devices 106 and 107 via network 100 and base station 102 or directly or in any other manner, where application server 108 may be any suitable source of any suitable date for a UE device, including any application data, protocol data, security data (e.g., key data), and/or the like. A GPS satellite 110 or any other suitable data source may be communicatively coupled to one or more of the UE devices 106 and 107 directly or via network 100 and base station 102 or in any other manner, where GPS satellite 110 may be operative to share timing data and/or any other suitable date with one or more UE devices 106 and 107, for example, even when base station 102 and/or network 100 may not be operative to share certain data with the UE device.

The communication area (or coverage area) of the base station 102 may be referred to as a "cell." The base station 102 and the UEs 106 and 107 may be configured to communicate over the transmission medium using any of various radio access technologies (RATs) or wireless communication technologies, such as GSM, UNITS (WCDMA, TDS-CDMA), LTE, LTE-Advanced (LTE-A), NR, OGRS, HSPA, 3GPP2 CDMA2000 (e.g., 1xRTT, 1xEV-DO, HRPD, eHRPD), Wi-Fi, and/or the like.

Base station 102 and other similar base stations (not shown) operating according to one or more cellular communication technologies may thus be provided as a network of cells, which may provide continuous or nearly continuous overlapping service to UE devices 106A-N and 107 and similar devices over a geographic area via one or more cellular communication technologies.

Note that, at least in some instances, a UE device 106/107 may be capable of communicating using any of multiple wireless communication technologies. For example, a UE device 106/107 might be configured to communicate using one or more of GSM, UMTS, CDMA2000, LTE, LTE-A, NR, OGRS, WLAN, Bluetooth, NFC, one or more global navigational satellite systems (GNSS (e.g., GPS or GLO-NASS)), one and/or more mobile television broadcasting standards (e.g., ATSC-M/H), and/or the like. Other combinations of wireless communication technologies (including more than two wireless communication technologies) are also possible. Likewise, in some instances, a UE device 106/107 may be configured to communicate using only a single wireless communication technology.

The UEs 106A and 106B may include handheld devices, such as smart phones or tablets, and/or may include any of various types of device with cellular communications capability. For example, one or more of the UEs 106A and 106B may be a wireless device intended for stationary or nomadic deployment, such as an appliance, measurement device, control device, and/or the like. The UE 106B may be configured to communicate with the UE device 107, which may be referred to as an accessory device 107. The accessory device 107 may be any of various types of wireless devices, typically a wearable device that has a smaller form factor, and may have limited battery, output power, and/or communications abilities relative to UEs 106. As one common example, the UE 106B may be a smart phone carried by a user, and the accessory device 107 may be a smart watch worn by that same user. The UE 106B and the accessory device 107 may communicate using any of various short range communication protocols, such as Bluetooth or Wi-Fi.

The UE 106B may also be configured to communicate with the UE 106A. For example, the UE 106A and UE 106B may be capable of performing direct device-to-device (D2D) communication. The D2D communication may be supported by the cellular base station 102 (e.g., the BS 102 may facilitate discovery, among various possible forms of assistance), or may be performed in a manner unsupported by the BS 102. For example, according to at least some aspects of this disclosure, the UE 106A and UE 106B may be capable of arranging and performing D2D communication (e.g., including D2D discovery communications) with each other even when out-of-coverage of the BS 102 and other cellular base stations.

FIG. 2 illustrates example UE devices 106A, 106B in D2D communication with each other. The UE devices 106A, 106B may be any of a mobile phone, a tablet, or any other type of hand-held device, a smart watch or other wearable device, a media player, a computer, a laptop, or virtually any type of wireless device.

The UEs 106A, 106B may each include a device or integrated circuit for facilitating cellular communication, which may be referred to as a cellular modem. The cellular modem may include one or more processors (processing elements) and various hardware components as described herein. The UEs 106A, 106B may each perform any of the method embodiments described herein by executing instructions on one or more programmable processors. Alternatively, or in addition, the one or more processors may be one or more programmable hardware elements such as an FPGA (field-programmable gate array), or other circuitry, that may be configured to perform any of the method embodiments described herein, or any portion of any of the method embodiments described herein. The cellular modem described herein may be used in a UE device as defined herein, a wireless device as defined herein, or a communication device as defined herein. The cellular modem described herein may also be used in a base station or other similar network side device.

The UEs 106A, 106B may include one or more antennas for communicating using two or more wireless communication protocols or radio access technologies. In some embodiments, one or both of the UE 106A or UE 106B might be configured to communicate using a single shared radio. The shared radio may couple to a single antenna, or may couple to multiple antennas (e.g., for MIMO) for performing wireless communications. Alternatively, the UE 106A and/or UE 106B may include two or more radios. Other configurations are also possible.

Figure 3:
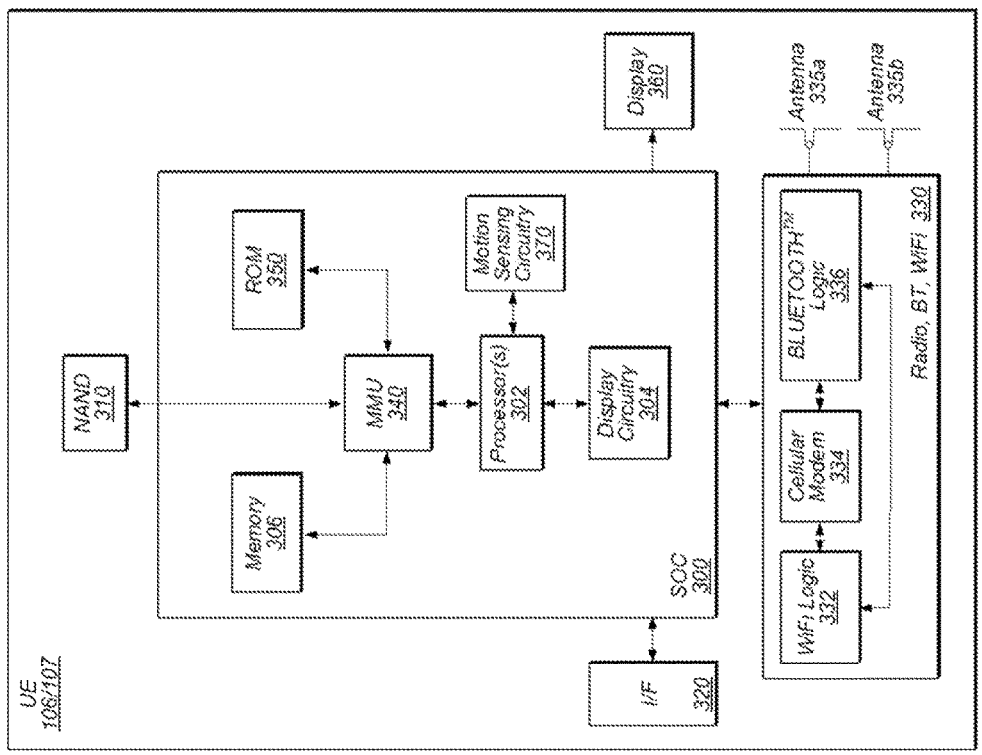
FIG. 3 is a block diagram illustrating an example wireless device, according to some embodiments.

FIG. 3—Block Diagram of a UE Device

FIG. 3 illustrates one possible block diagram of a UE device, such as UE device 106 or 107. As shown, UE device 106/107 may include a system on chip (SOC) 300, which may include portions for various purposes. For example, as shown, SOC 300 may include processor(s) 302 which may execute program instructions for UE device 106/107, and display circuitry 304 that may perform graphics processing and provide display signals to a display 360. SOC 300 may also include motion sensing circuitry 370 that may detect motion of UE 106, for example using a gyroscope, accelerometer, and/or any of various other motion sensing components. Processor(s) 302 may also be coupled to a memory management unit (MMU) 340, which may be configured to receive addresses from processor(s) 302 and translate those addresses to locations in memory (e.g., memory 306, read only memory (ROM) 350, flash memory 310). MMU 340 may be configured to perform memory protection and page table translation or set up. In some embodiments, MMU 340 may be included as a portion of processor(s) 302.

As shown, SOC 300 may be coupled to various other circuits of UE 106/107. For example, UE 106/107 may include various types of memory (e.g., including NAND flash 310), a connector interface (I/F) 320 (e.g., for coupling to a computer system, dock, charging station, etc.), display 360, and wireless communication circuitry 330 (e.g., for LTE, LTE-A, NR, OGRS, CDMA2000, Bluetooth, Wi-Fi, NFC, GPS, etc.).

UE device 106/107 may include at least one antenna, and, in some embodiments, multiple antennas 335a and 335b, for performing wireless communication with base stations and/or other devices. For example, UE device 106/107 may use antennas 335a and 335b to perform the wireless communication. As noted above, UE device 106/107 may, in some embodiments, be configured to communicate wirelessly using a plurality of wireless communication standards or radio access technologies (RATs).

Wireless communication circuitry 330 may include Wi-Fi Logic 332, a Cellular Modem 334, and Bluetooth Logic 336. Wi-Fi Logic 332 may be for enabling UE device 106/107 to perform Wi-Fi communications on an 802.11 network. Bluetooth Logic 336 may be for enabling UE device 106/107 to perform Bluetooth communications. Cellular modem 334 may be a lower power cellular modem capable of performing cellular communication according to one or more cellular communication technologies.

As described herein, UE 106/107 may include hardware and software components for implementing embodiments of this disclosure. For example, one or more components of wireless communication circuitry 330 (e.g., cellular modem 334) of UE device 106/107 may be configured to implement part or all of the methods described herein (e.g., by a processor executing program instructions stored on a memory medium (e.g., a non-transitory computer-readable memory medium), a processor configured as an FPGA (Field Programmable Gate Array), and/or using dedicated hardware components, which may include an application specific integrated circuit (ASIC)).

Figure 4:
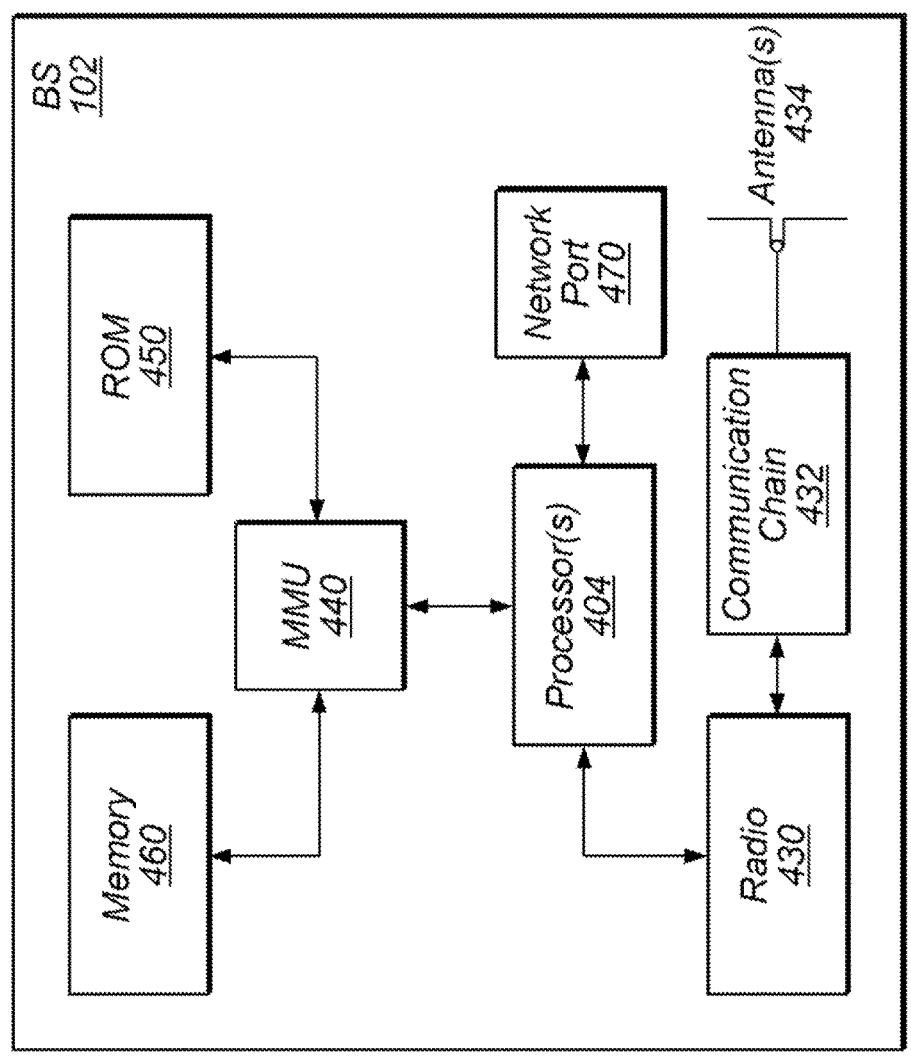
FIG. 4 is a block diagram illustrating an example base station, according to some embodiments.

FIG. 4—Block Diagram of a Base Station

FIG. 4 illustrates an example block diagram of a base station 102, according to some embodiments. It is noted that the base station of FIG. 4 is only one example of a possible base station. As shown, base station 102 may include processor(s) 404 that may execute program instructions for base station 102. Processor(s) 404 may also be coupled to memory management unit (MMU) 440, which may be configured to receive addresses from processor(s) 404 and translate those addresses to locations in memory (e.g., memory 460 and read only memory (ROM) 450) or to other circuits or devices.

Base station 102 may include at least one network port 470. Network port 470 may be configured to couple to a telephone network and provide a plurality of devices, such as UE devices 106/107, access to the telephone network as described above in FIGS. 1 and 2.

Network port 470 (or an additional network port) may also or alternatively be configured to couple to a cellular network (e.g., a core network of a cellular service provider). The core network may provide mobility related services and/or other services to a plurality of devices, such as UE devices 106/107. For example, the core network may include a mobility management entity (MME) (e.g., for providing mobility management services), a serving gateway (SGW) and/or packet data network gateway (PGW) (e.g., for providing external data connections, such as to the Internet, etc.). In some cases, network port 470 may couple to a telephone network via the core network, and/or the core network may provide a telephone network (e.g., among other UE devices serviced by the cellular service provider).

Base station 102 may include at least one antenna 434, and possibly multiple antennas. Antenna(s) 434 may be configured to operate as a wireless transceiver and may be further configured to communicate with UE devices 106/107 via radio 430. Antenna(s) 434 may communicate with radio 430 via communication chain 432. Communication chain 432 may be a receive chain, a transmit chain, or both. Radio 430 may be configured to communicate via various wireless communication standards, including, but not limited to, LTE, LTE-A, NR, OGRS, GSM, UMTS, CDMA2000, Wi-Fi, and/or the like.

Base station (BS) 102 may be configured to communicate wirelessly using multiple wireless communication standards. In some instances, base station 102 may include multiple radios, which may enable base station 102 to communicate according to multiple wireless communication technologies. For example, as one possibility, base station 102 may include an LTE radio for performing communication according to LTE as well as a Wi-Fi radio for performing communication according to Wi-Fi. In such a case, base station 102 may be capable of operating as both an LTE base station and a Wi-Fi access point. As another possibility, base station 102 may include a multi-mode radio which is capable of performing communications according to any of multiple wireless communication technologies (e.g., LTE and Wi-Fi, LTE and UMTS, LTE and CDMA2000, UMTS and GSM, etc.).

BS 102 may include hardware and software components for implementing or supporting implementation of features described herein. For example, while many of the features described herein relate to device-to-device communication that can be performed by UE devices without relying on an intermediary base station, a cellular base station may be configured to also be capable of performing device-to-device communication in accordance with the features described herein. As another possibility, BS 102 may be instrumental in configuring a UE 106 to perform device-to-device communication according to the features described herein, and/or certain features described herein may be performed or not performed by a device based at least in part on whether there is a BS 102 providing cellular service within range of the device. According to some embodiments, processor 404 of base station 102 may be configured to implement part or all of the methods described herein (e.g., by executing program instructions stored on a memory medium (e.g., a non-transitory computer-readable memory medium)). Alternatively, processor 404 may be configured as a programmable hardware element, such as a field programmable gate array (FPGA), or as an ASIC, or a combination thereof. Alternatively or in addition, processor 404 of BS 102, in conjunction with one or more of the other components 430, 432, 434, 440, 450, 460, 470, may be configured to implement or support implementation of part or all of the features described herein.

Figure 5:
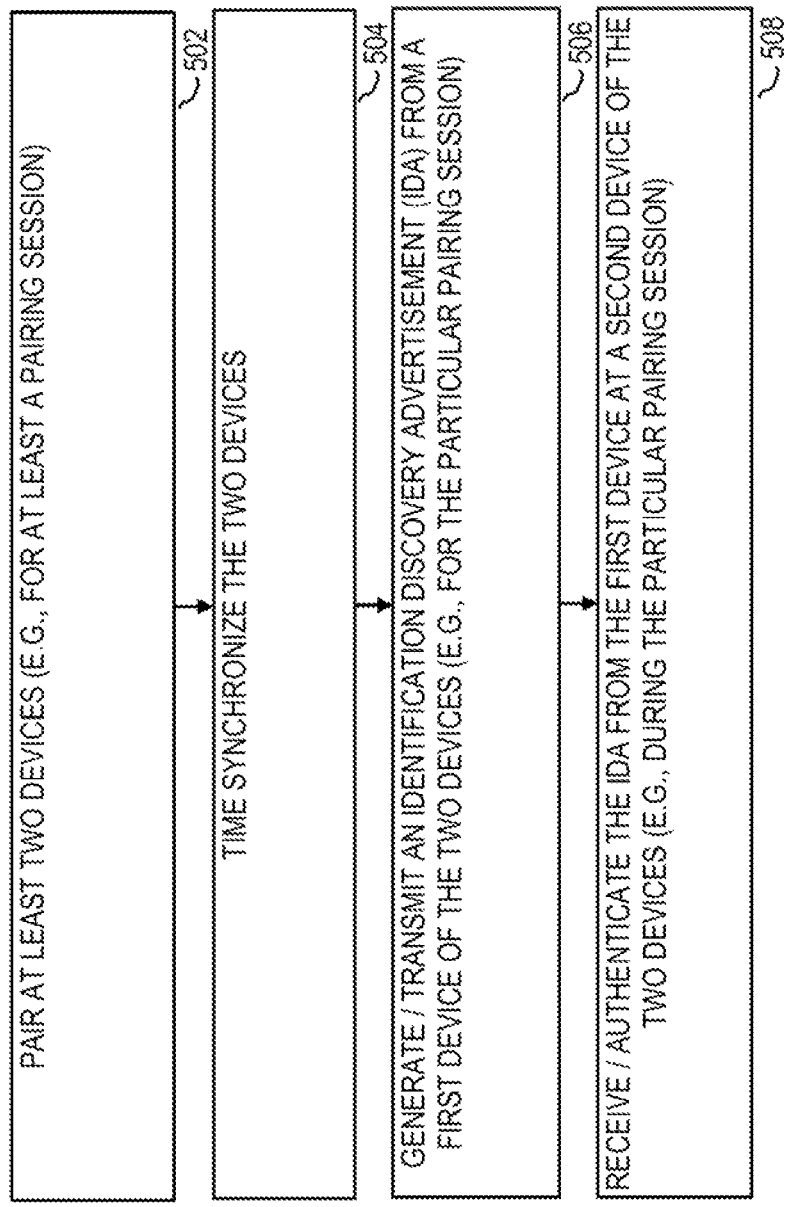
FIGS. 5-7 are flowchart diagrams illustrating exemplary methods for securely authenticating identification when performing device-to-device wireless communications, according to some embodiments.
Figure 6:
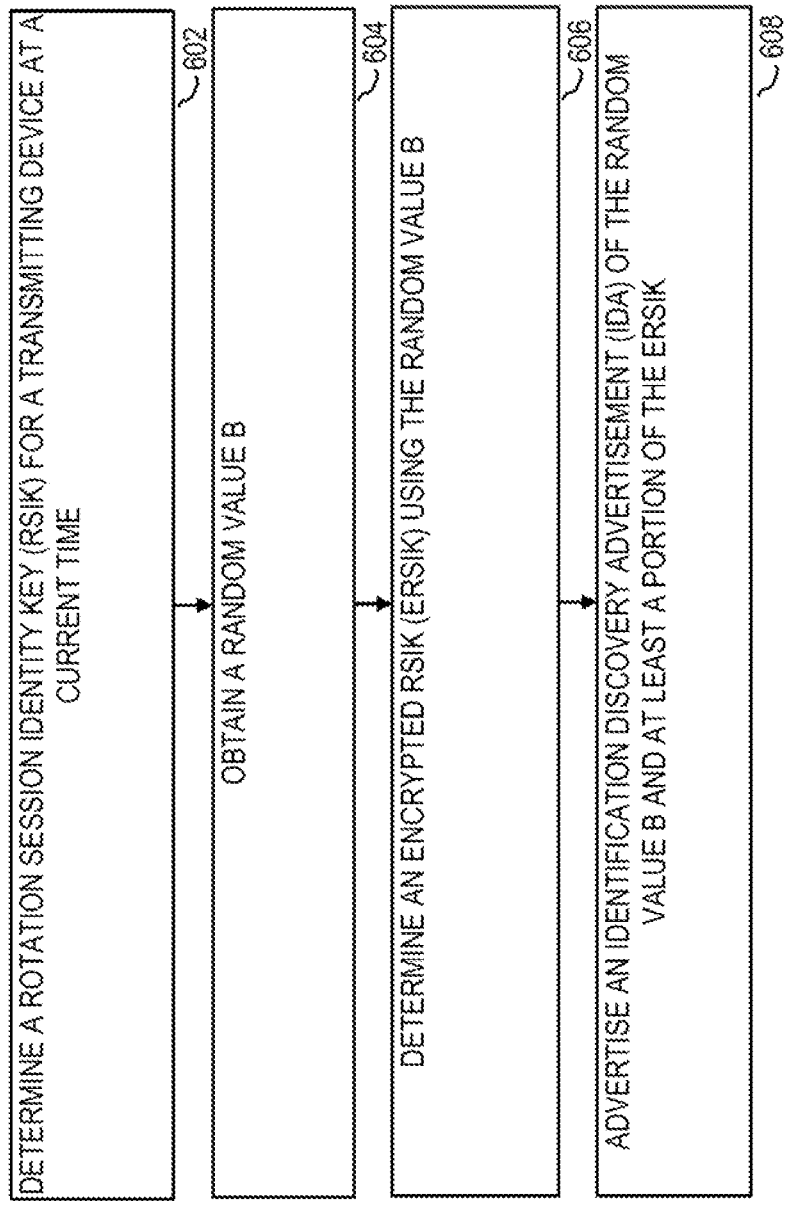
Figure 7:
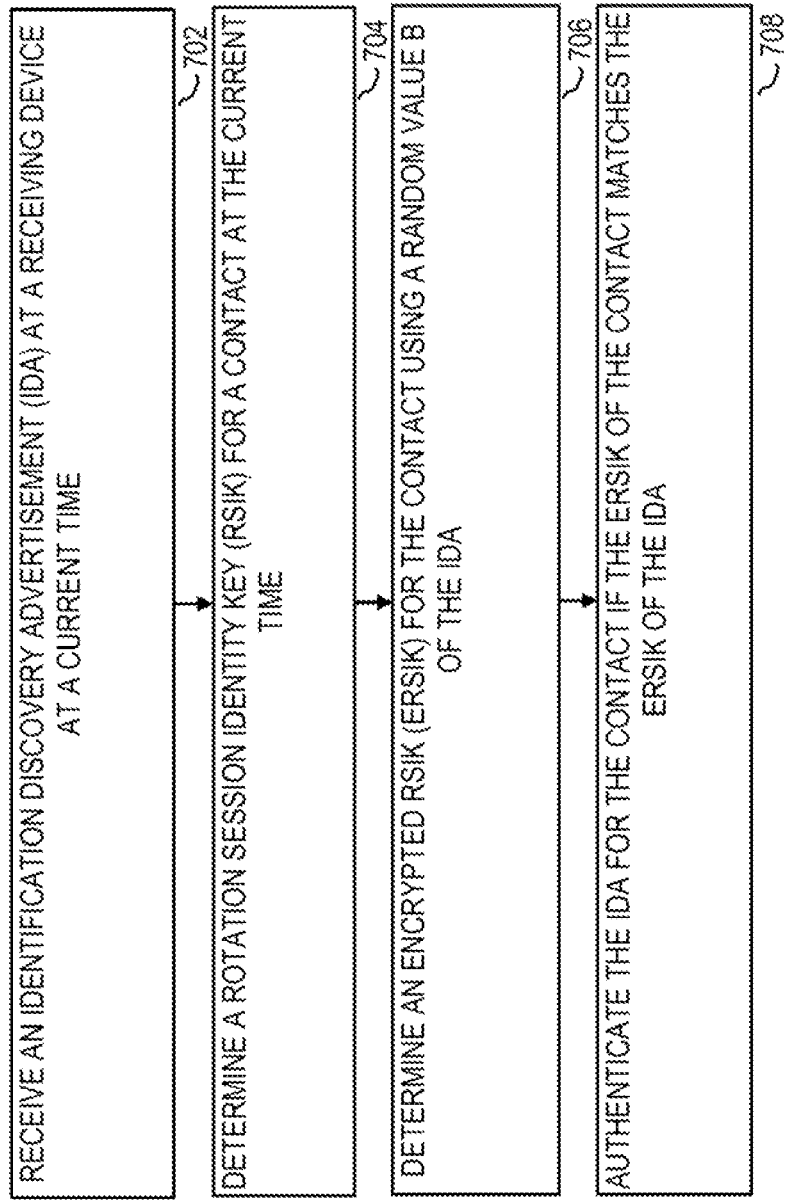

FIGS. 5-7—Identification Authentication Flow Diagrams

FIGS. 5-7 are flow diagrams illustrating methods or processes for securely authenticating identification for device-to-device wireless communications with reduced overhead, according to some embodiments. In various embodiments, some of the elements or operations of the methods shown may be performed concurrently, in a different order than shown, may be substituted for by other method elements or operations, or may be omitted. Additional method elements or operations may also be performed as desired.

Aspects of the methods of FIGS. 5-7 may be implemented by a wireless device, such as UEs 106A-B or 107 illustrated in and described with respect to FIGS. 1-3, or more generally in conjunction with any of the computer systems or devices shown in the FIGS. or described herein, among other devices, as desired. Note that while at least some elements of the methods of FIGS. 5-7 may be described in a manner relating to the use of communication techniques and/or features associated with LTE, OGRS, and/or 3GPP specification documents, such description is not intended to be limiting to the disclosure, and aspects of the methods of FIGS. 5-7 may be used in any suitable wireless communication system, as desired.

For each of FIGS. 5-7, at least two wireless devices may form a device-to-device (D2D)/peer-to-peer (P2P) group, such as an OGRS group. This may include a master device transmitting synchronization signals, and any member devices obtaining synchronization to the OGRS group based on receiving the synchronization signals, such as for synchronizing any suitable clocks or timing between the devices. A master information block (MIB) may also be transmitted by the group master and received by the group members, which may provide additional information, such as possible discovery resources, a frequency hopping scheme used for discovery, and/or any of various other information.

Figure 2A:
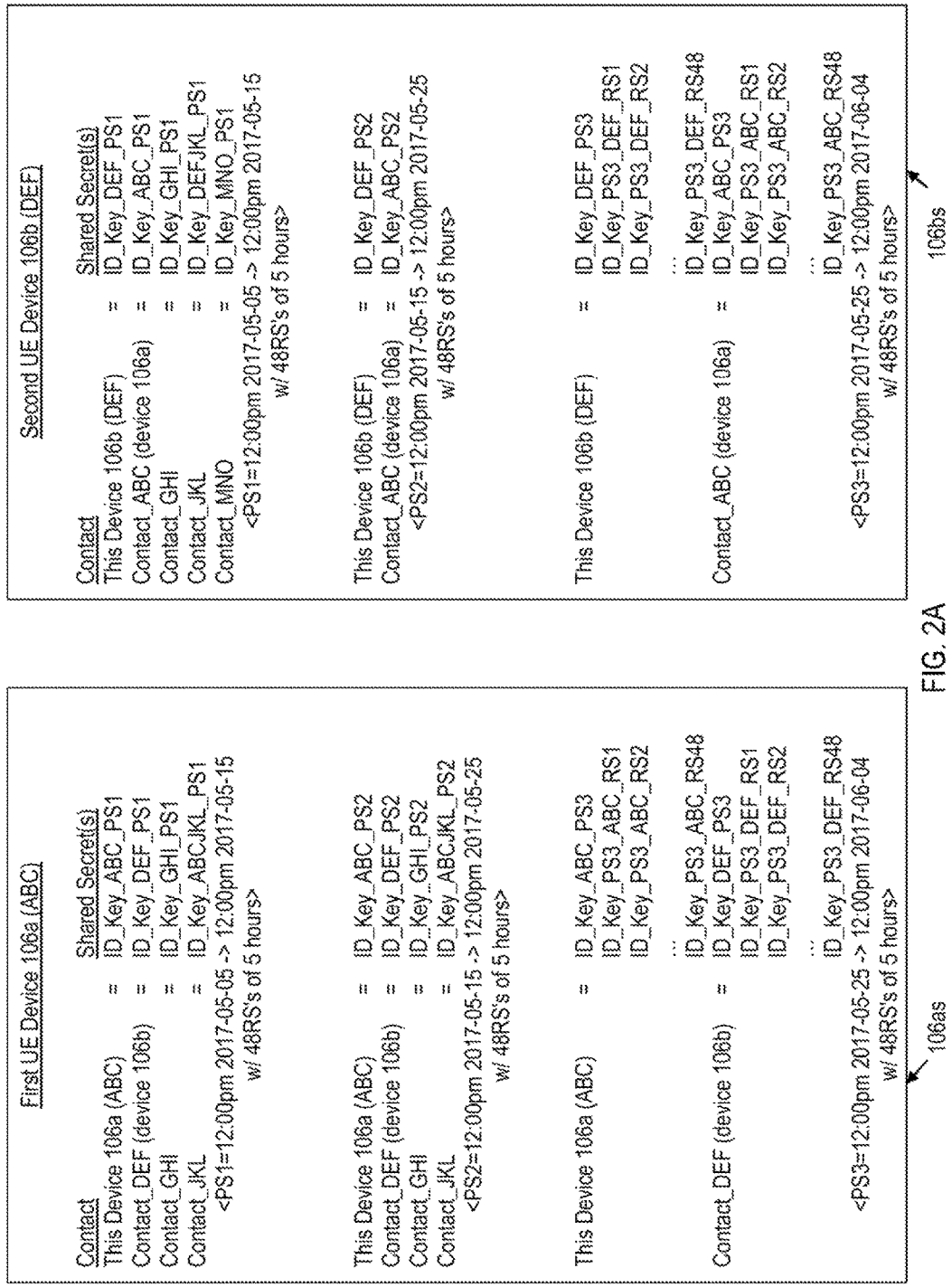
FIG. 2A illustrates various shared secret data that may be accessible to various paired wireless devices of the system of FIG. 2, according to some embodiments.

At operation 502 of a process 500 of FIG. 5, at least two devices may be paired, such as for at least one upcoming pairing session (e.g., a session of any suitable finite or limited duration of time (e.g., not indefinite or for an undefined period of time). For example, UE device 106a and UE device 106b may be paired at operation 502 for enabling certain secure authentication. For example, during a pairing process, any suitable shared secret, such as at least one set of symmetric keys, may be shared between the two particular user devices. In some embodiments, a shared secret may be associated with a particular pairing session (pairing period) of any suitable limited or finite duration, whereby the shared secret may only be viable during that pairing session. A pairing process may also be operative to ensure that a particular communication protocol is shared between the devices being paired. For example, one or more particular key derivation functions, one or more particular cryptographic hash functions, device-to-device protocols, and/or any other suitable protocol data may be shared or ensured to be common between the two devices such that each device may each be operative to securely authenticate the other device during device-to-device wireless communications. As shown in FIG. 2A by data set 106as available to device 106a, for example, for a first pairing session (PS1), first UE device 106a (e.g., a device for a user ABC) may be provided with (at operation 502) at least one pairing session identity key (PSIK) for itself, such as ID_Key_ABC_PS1, as well as at least one unique PSIK for each one of at least a subset of contacts (e.g., contacts stored in a contact application for the user ABC of UE device 106a), such as ID_Key_DEF_PS1 for a contact DEF (e.g., a user of second UE device 106b), ID_Key_GHI_PS1 for a contact GHI (e.g., a user of another UE device), and ID_Key_ABCJKL_PS1 for a contact JKL (e.g., a user of yet another UE device). Additionally, as shown in FIG. 2A by data set 106bs available to device 106b, for example, for a first pairing session (PS1), second UE device 106b (e.g., a device for a user DEF) may be provided with (at operation 502) at least one pairing session identity key (PSIK) for itself, such as ID_Key_DEF_PS1, as well as at least one unique PSIK for each one of at least a subset of contacts (e.g., contacts stored in a contact application for the user DEF of UE device 106b), such as ID_Key_ABC_PS1 for a contact ABC (e.g., a user of first UE device 106a), ID_Key_GHI_PS1 for a contact GHI (e.g., a user of another UE device), ID_Key_DEFJKL_PS1 for a contact JKL (e.g., a user of yet another UE device), and ID_Key_MNO_PS1 for a contact MNO (e.g., a user of another UE device). As shown, each one of ID_Key_ABC_PS1 and ID_Key_DEF_PS1 may be a shared secret (e.g., a set of symmetric keys) between UE devices 106a and 106b for PS1, whereby such keys may respectively be the pairing session identity key for devices 106a and 106b for PS1. Additionally, in some embodiments, ID_Key_GHI_PS1 may also be a shared secret between UE devices 106a and 106b for PS1, despite such a key being the PSIK for another UE device that is neither UE device 106a nor UE device 106b, but that UE device may be for a shared contact GHI of UE devices 106a and 106b. However, as another example of a shared contact between devices 106a and 106b, contact JKL of another UE device may have different PSIKs shared with different UE devices for PS1, such as ID_Key_ABCJKL_PS1 at device 106a of user ABC and ID_Key_DEFJKL_PS1 at device 106b of user DEF, such that a shared secret between the device of contact JKL and device 106a of contact ABC for PS1 may be different than the shared secret between the device of contact JKL and device 106b of contact DEF for PS1. The shared secret(s) that may be made accessible to a particular UE device during a particular pairing operation may be associated with any suitable contacts, such as all contacts of the UE device, only the most commonly used (e.g., favorite) contacts of the UE device, only a subset of contacts selected for the particular pairing operation (e.g., automatically in any fashion or manually by the user), such as only those contacts with which the device is expected to potentially communicate using the D2D communication protocol (e.g., a particular group of friends that may be camping with the user of the UE device or on a cruise ship with the user of the UE device or the like). Such pairing may be accomplished when each device, either simultaneously or at any suitable times that may be different than one another, is communicatively coupled to an application server, such as application server 108, that may be managed by any suitable entity (e.g., Apple Inc.) that may be responsible for a P2P application (e.g., iMessage by Apple Inc.) or otherwise that may support the D2D or P2P wireless communication (e.g., OGRS). In such embodiments, one or more of the shared secrets (PSIKs) may be generated by a UE device and shared with the application server 108 for then sharing with another UE device being paired. Alternatively or additionally, one or more of the shared secrets (PSIKs) may be generated by application server 108 and shared with the UE devices being paired. Alternatively, if application server 108 is not accessible to the UE devices being paired, the UE devices may be directly communicatively coupled to one another (e.g., via NFC, WiFi, BT, wired connection, etc.) and any suitable shared secret data (e.g., PSIKs) for those two devices (e.g., ID_Key_ABC_PS1 and ID_Key_DEF_PS1) may be generated in any suitable manner and/or shared between those devices. Therefore, operation 502 may be carried out for the two devices being paired for a particular period session, such as UE device 106a and UE device 106b for PS1, either simultaneously, or operation 502 may be carried out at different times for UE device 106a and UE device 106b. As shown, ID_Key_ABC_PS1 may be a first shared secret between UE device 106a and UE device 106b for a first pairing session PS1 of a limited duration. Moreover, as shown, ID_Key_DEF_PS1 may be a second shared secret between UE device 106a and UE device 106b for the first pairing session PS1.

Prior to, concurrently therewith, and/or after any such pairing of operation 502, the two devices may be time synchronized with one another using any suitable time synchronization mechanism(s) at operation 504 of process 500. For example, during such a synchronization process, any suitable measures may be taken to ensure that UE device 106a and UE device 106b have the same notion of time, which may include determining that the two devices have reliable internal clocks (e.g., which may or may not be susceptible to drift) and/or synchronizing each device's clock to a clock of a reliable master device or any suitable remote source of data (e.g., a GPS satellite). Operation 504 may be carried out for the two devices either simultaneously, or operation 504 may be carried out at different times for UE device 106a and UE device 106b.

Once at least two devices have been paired and time synchronized, a first of the at least two devices may generate and transmit an identification discovery advertisement (IDA) from the first device at operation 506 of process 500. For example, once UE devices 106a and 106b have been paired for PS1 at operation 502 and have been time synchronized at operation 504, first UE device 106a may generate and/or transmit an IDA. The IDA may be uniquely generated based on a shared secret available to (transmitting) UE device 106a (e.g., PSIK ID_Key_ABC_PS1, as made available during the pairing process for PS1) and may be further uniquely generated based on pairing session PS1 associated with the pairing process, and, in some embodiments, may be further uniquely generated based on a particular rotation session (rotation period) of a number of rotation sessions (RS's) of such a pairing session, where such a particular rotation session may be associated with the current time at which the IDA is generated and transmitted (e.g., as described with respect to process 600 of FIG. 6).

Then, at least one second device of the at least two devices may receive and authenticate the IDA from the first device at operation 508 of process 500. For example, once UE devices 106a and 106b have been paired for PS1 at operation 502 and have been time synchronized at operation 504, and after first UE device 106a has generated and/or transmitted an IDA at operation 506, second UE device 106b may receive and attempt to authenticate the IDA transmitted by UE device 106a. Such authentication of the IDA may be uniquely carried out based on a shared secret available to (receiving) UE device 106b (e.g., PSIK ID_Key_ABC_PS1, as made available during the pairing process for PS1 and/or as used during the generation of the IDA) and may be further uniquely carried out during the pairing session associated with the pairing process, and, in some embodiments, may be further uniquely carried out based on a particular rotation session of such a pairing session, where such a particular rotation session may be associated with the current time at which the IDA is received and authenticated (e.g., as described with respect to process 700 of FIG. 7).

Process 500, or certain operations thereof, may be repeated at any suitable intervals. For example, operation 502 may be repeated before the end of the period session associated with the last iteration of operation 502. For example, if period session 1 (PS1) of a first iteration of operation 502 is associated with a period of time extending between 12:00 PM EST on May 5, 2017 and 12:00 PM EST on May 15, 2017, then a second iteration of operation 502 for a second period session (PS2) extending between 12:00 PM EST on May 15, 2017 and 12:00 PM EST on May 25, 2017 may be carried out by each applicable UE device prior to 12:00 PM EST on May 15, 2017 for obtaining any suitable shared secret data associated with that PS2 (e.g., as shown in FIG. 2A). Similarly, if period session 2 (PS2) of a second iteration of operation 502 is associated with a period of time extending between 12:00 PM EST on May 15, 2017 and 12:00 PM EST on May 25, 2017, then a third iteration of operation 502 for a third period session (PS3) extending between 12:00 PM EST on May 25, 2017 and 12:00 PM EST on June 4, 2017 may be carried out by each applicable UE device prior to 12:00 PM EST on May 25, 2017 for obtaining any suitable shared secret data associated with that PS3 (e.g., as shown in FIG. 2A). In some embodiments, shared secret data associated with more than one period session may be made accessible to a UE device at a single iteration of operation 502 (e.g., the shared secrets associated with each one of PS2 and PS3 may be made available to a UE during a second iteration of operation 502 (e.g., prior to 12:00 PM EST on May 15, 2017)). Alternatively, shared secret data associated with a particular upcoming period session may be made accessible to a UE device at a single iteration of operation 502 (e.g., the shared secrets associated with PS3 may only be made available to a UE device during PS2).

In some embodiments, a different shared secret for each rotation session of a pairing session may be made available at operation 502. For example, pairing session PS3 extending between 12:00 PM EST on May 25, 2017 and 12:00 PM EST on Jun. 4, 2017 may be associated with 48 rotation sessions (RS1-RS48), each one extending for exactly 10 hours (e.g., RS1 extending between 12:00 PM EST on May 25, 2017 and 10:00 PM EST on May 25, 2017, RS2 extending between 10:00 PM EST on May 25, 2017 and 6:00 AM EST on May 26, 2017, etc.), and 48 shared secrets may be made available to a paired device, such as 48 rotation session identity keys (RSIK), such as RSIKs ID_Key_PS3_ABC_RS1 through ID_Key_PS3_ABC_RS48 and RSIKs ID_Key_PS3_DEF_RS1 through ID_Key_PS3_DEF_RS48 (e.g., as shown in FIG. 2A). Alternatively, RSIKs for a particular pairing session may be generated on board a UE device after receiving a PSIK for a pairing session (e.g., as described with respect to process 600 of FIG. 6 and process 700 of FIG. 7).

Operation 602 of process 600 of FIG. 6 may include a first (transmitting) UE device (e.g., UE device 106a) configured to determine an RSIK for the transmitting device at the current time. For example, if the current time is determined to be anywhere between 12:00 PM EST on May 25, 2017 and 10:00 PM EST on May 25, 2017, then the transmitting device UE device 106a may be operative to determine that the appropriate RSIK for the transmitting device at the current time is ID_Key_PS3_ABC_RS1. As another example, if the current time is determined to be anywhere between 10:00 PM EST on May 25, 2017 and 6:00 AM EST on May 26, 2017, then the transmitting device UE device 106a may be operative to determine that the appropriate RSIK for the transmitting device at the current time is ID_Key_PS3_ABC_RS2. As another example, such an RSIK may be generated on the fly by the transmitting device. For example, if the current time is determined to be anywhere between 12:00 PM EST on May 5, 2017 and 10:00 PM EST on May 5, 2017, then the transmitting device UE device 106a may be operative to determine that the current pairing session is PS1 and that the current rotation session is the first rotation session RS1 of PS1, and the transmitting user device 106a may be operative to determine the appropriate RSIK for RS1 of PS1 by using any suitable key derivation function (KDF) on the PSIK of UE device 106a for PS1 (ID_Key_ABC_PS1) and an appropriate identification of the current rotation session (e.g., "PS1_RS1") to determine the RSIK for RS1 of PS1 (e.g., KDF ("ID_Key_ABC_PS1", "PS1_RS1") may result in "ID_Key_PS1_ABC_RS1"). At operation 604, the transmitting UE device may obtain any suitable random number or value B from any suitable random number or value generator or otherwise. Number B may be any suitable length, such as between 1 byte and 3 bytes, or 2 bytes, or any other suitable size. Then, at operation 606, the transmitting device may determine an encrypted RSIK (ERSIK) for the particular RSIK determined at operation 602 using the number B determined at operation 604. For example, the transmitting device may generate the appropriate ERSIK by using any suitable cryptographic hash function (e.g., SHA-256, SHA-512, etc.) on the number B and the RSIK to determine the ERSIK (e.g., HASH ("B"||"RSIK") (e.g., SipHash ("B"||"ID_Key_PS3_ABC_RS2")) may result in a particular ERSIK). Such a cryptographic hash function or other suitable encryption scheme used at operation 606 may also be known to one, some, or all potential receiving devices (e.g., as confirmed during a pairing process or device configuration). Then, at operation 608 of process 600, the transmitting UE device may transmit an IDA including B and at least a portion of the ERSIK. For example, B may be used as a prefix and the entirety of the ERSIK may be used as a suffix of the IDA (e.g., IDA=(B||ERSIK)), where the IDA may be advertised as PHY level discovery. Alternatively, any suitable truncation may be used to determine a truncated portion of the ERSIK (TERSIK), such as the first 2 bytes or last 2 bytes of the ERSIK, and the TERSIK may be used as a portion of the IDA (e.g., as a suffix) and number B may be used as another portion of the IDA, where the IDA may be BTERSIK (e.g., IDA=(B||TERSIK)) (or BERSIK if no truncation (e.g., IDA=(B||ERSIK))).

TERSIK may be any suitable length, such as between 1 byte and 3 bytes, or 2 bytes, or any other suitable size. In some particular examples, therefore, IDA may be any suitable length, such as between 2 bytes and 6 bytes, or no more than 4 bytes, or any other suitable size. This may be a short message to reduce the overhead of the communication of such IDAs.

Operation 702 of process 700 of FIG. 7 may include a second (receiving) UE device (e.g., UE device 106b) configured to receive an IDA from a transmitting device (e.g., "BTERSIK" from operation 608 of process 600) at a current time (e.g., a time that may be just after the current time of operation 602 (after minimal delay between operations 602 and 608 and receipt of IDA at operation 702). At operation 704, the receiving UE device may determine an RSIK for a contact of the receiving device at the current time. For example, if the current time is determined to be anywhere between 12:00 PM EST on May 25, 2017 and 10:00 PM EST on May 25, 2017, then receiving UE device 106b may be operative to determine that the appropriate RSIK for contact ABC (e.g., device 106a) at the current time is ID_Key_PS3_ABC_RS1 as available at device 106b (see FIG. 2A). As another example, if the current time is determined to be anywhere between 10:00 PM EST on May 25, 2017 and 6:00 AM EST on May 26, 2017, then the receiving UE device 106b may be operative to determine that the appropriate RSIK for contact ABC at the current time is ID_Key_PS3_ABC_RS2. As another example, such an RSIK may be generated on the fly by the receiving device. For example, if the current time is determined to be anywhere between 12:00 PM EST on May 5, 2017 and 10:00 PM EST on May 5, 2017, then the receiving UE device 106b may be operative to determine that the current pairing session is PS1 and that the current rotation session is the first rotation session RS1 of PS1, and the receiving user device 106b may be operative to determine the appropriate RSIK for RS1 of PS1 for contact ABC by using any suitable key derivation function (KDF) on the PSIK of contact ABC (UE device 106a) for PS1 (ID_Key_ABC_PS1) and an appropriate identification of the current rotation session (e.g., "PS1_RS1") to determine the RSIK for RS1 of PS1 (e.g., KDF ("ID_Key_ABC_PS1", "PS1_RS1") may result in "ID_Key_PS1_ABC_RS1"). The KDF used at operation 704 may be the same as that used at operation 602 based on a protocol of the paired devices (e.g., the P2P wireless communication). At operation 706, the receiving UE device may obtain random number B from the IDA received at operation 702 and then determine an encrypted RSIK (ERSIK) for the particular RSIK determined at operation 704 for the contact using the number B of the received IDA. For example, the receiving device may generate the appropriate ERSIK for the contact by using any suitable cryptographic hash function (e.g., SHA-256, SHA-512, etc.) on the number B and the RSIK of the contact to determine the ERSIK (e.g., HASH ("B"||"RSIK") (e.g., ("B"||"ID_Key_PS3_ABC_RS2")) may result in a particular ERSIK). The hash function used at operation 706 may be the same as that used at operation 606 based on a protocol of the paired devices (e.g., the P2P wireless communication). Then, at operation 708 of process 700, the receiving UE device may determine if the ERSIK of operation 706 for the contact matches (as is or when truncated) the ERSIK (or TERSIK) of the IDA received at operation 702 and, if so, then the receiving UE device may authenticate or validate or otherwise confirm the IDA of operation 702 for the contact of operation 704 (e.g., for use during the remainder of the current rotation session). If no match, operations 704-708 may be repeated for another contact of the receiving UE device.

By generating an IDA that may be uniquely based on a particular shared secret of a particular pairing session and based on a particular rotation session of the particular pairing session, the size of the IDA may be reduced while facilitating a robust amount of privacy. That is, despite a short IDA being susceptible to being repeatedly generated at a particular frequency, because each rotation session and each pairing session may only be functional or viable for a limited amount of time, the viable duration of such session(s) may be defined so as to avoid a particular amount of risk or lack of security that may otherwise be presented due to the repeatability susceptibility of the small IDA. The two devices may be re-paired before the end of a particular pairing session such that a shared secret (e.g., one or more symmetrical key sets) may be rotated or refreshed or updated for a new pairing session. An authenticated IDA for the contact at the receiving device (e.g., of process 700) may be used as at least a portion of a media access control address (MAC address) of one of the devices for use in future data communications between the two devices (e.g., during the remainder of the associated rotation session or pairing session). Therefore, such use of an IDA may be operative to minimize or otherwise reduce overhead when securely authenticating P2P devices. Such generation and/or such authentication using an IDA may be handled exclusively or substantially or at least partially at a particular layer (e.g., using a protocol layer in the D2D protocol stack, such as the PDCP/NAS security over MAC layer, and/or physical layer (PHY layer) (e.g., on a cellular baseband or modem side or domain)) rather than at another (higher) particular layer of the protocol stack (e.g., the application layer (e.g., on an application processor side or domain)). Because OGRS may utilize relatively little bandwidth and provide relatively little throughput, it may be correspondingly more useful to reduce the throughput or overhead of over-the-air signaling of such an IDA between devices and/or to avoid or reduce the use of higher layer functionality layers of one or both devices during such identification authentication. This may allow the wireless device to reduce the over-the-air signaling burden on the D2D link (e.g., since a reduced length IDA may be used for frequent device advertisement). This may be particularly helpful for D2D links with relatively low bandwidth and/or throughput capability, for which such potentially large IDAs may have a substantial impact on the ability of the devices using those links to communicate data with each other. For example, when an IDA is authenticated for a contact at a receiving device at process 700, that IDA may be used as at least a portion of a MAC address for future communication between the receiving device and the device of that contact for the remainder of the session associated with the authentication. For example, after operation 708, the receiving device may transmit a communication to the device associated with the contact, where the communication may indicate that the authenticated IDA will be used as at least a portion of or the entirety of a MAC address for future communications between the two devices. Another portion of such a MAC address may be an authenticated IDA for a contact of the receiving device on the transmitting device (e.g., processes 600 and 700 may be carried out similarly but for the receiving device now as the transmitting device and for the transmitting device now as the receiving device (e.g., a first iteration of processes 600 and 700 may be carried out during session PS1, where UE device 106*a* is the transmitting device, UE device 106*b* is the receiving device, and the shared secret key used at each one of devices 106*a* and 106*b* may be ID_Key_ABC_PS1 as associated with transmitting device 106*a*, while a second iteration of processes 600 and 700 may be carried out during session PS1, where UE device 106*a* is the receiving device, UE device 106*b* is the transmitting device, and the shared secret key used at each one of devices 106*a* and 106*b* may be ID_Key_DEF_PS1 as associated with transmitting device 106*b*)). Therefore, in future communications between a first device and a second device during a particular session, a MAC address may include some combination of a first authenticated IDA for the first device of the session and a second authenticated IDA for the second device of the session. A media access control address (MAC address) of a device may be a unique identifier assigned to network interfaces for communications at the data link layer of a network segment. MAC addresses may be used as a network address for most IEEE 802 network technologies, including Ethernet and Wi-Fi. Logically, MAC addresses may be used in the media access control protocol sublayer of the open systems interconnection (OSI) reference model.

FIGS. 8-12 and Additional Information

FIGS. 8-12 and the following additional information are provided as being illustrative of further considerations and possible implementation details relating to the methods of FIGS. 5-7, and are not intended to be limiting to the disclosure as a whole. Numerous variations and alternatives to the details provided herein below are possible and should be considered within the scope of the disclosure.

At least some existing wireless communication technologies include framework elements for D2D/P2P communication, which may also be referred to as sidelink communication. For example, the 3GPP standards organization includes D2D/sidelink protocols (e.g., in which, in addition to synchronization signals transmitted in the central 6 RBs of the system bandwidth, discovery pool resources, sidelink control channel allocations, and sidelink shared channel allocations may be located in various other (e.g., outer) RBs of the system bandwidth over time). Such sidelink communication performed according to D2D protocols may encompass a variety of possible operating bandwidths (e.g., encompassing at least 6RBs (e.g., 1.4 MHz) and potentially up to 100 RBs (e.g., 20 MHz), according to some embodiments). As another possibility, a more narrowband (e.g., 180 kHz) deployment may be used, if desired. For example, for the transmit power regimes of many devices, propagation characteristics for narrowband communications may result in greater range capacity than wider-band communications.

As another possibility for potentially providing a relatively long communication range for D2D communication, at least in some instances, a lower-frequency communication band (e.g., 900 MHz unlicensed spectrum, as one possibility) may be used for D2D communication.

According to some embodiments, the techniques described herein may be used in scenarios when one or more of the communicating wireless devices are not within communication range of a cellular base station (e.g., the devices may be OOC), according to some embodiments. For example, D2D communication techniques may be used to allow two (or more) peer devices to communicate in isolated areas without cellular service, without a cellular service subscription, and/or under other circumstances.

Figure 8:
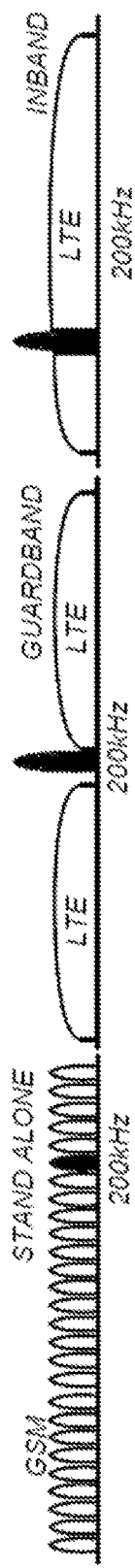
FIG. 8 illustrates various exemplary possible carrier deployment scenarios, according to some embodiments.

As one possibility for providing a physical narrowband carrier for narrowband D2D communications, a NB-IoT carrier may be used. FIG. 8 illustrates a variety of exemplary possible NB-IoT carrier deployment modes, according to some embodiments. The illustrated deployment modes may include standalone deployments (e.g., in a repurposed GSM band), guardband deployments (e.g., in a guardband frequency between LTE carriers), and inband deployments (e.g., within an LTE carrier). In any of these possible deployment modes, NB-IoT carriers may include a variety of features. For example, among various possible characteristics, NB-IoT carriers may support flexible timelines for control and data channels; peak rates of approximately 20 kbps in the downlink and 60 kbps in the uplink may be supported; single tone (e.g., 3.75 KHz vs. 15 KHz) and multi tone (15 kHz) uplink modulation, using pill binary phase shift keying or pi/4 quadrature phase shift keying may be used (quadrature phase shift keying may also be used in the downlink); single antenna, half duplex frequency division duplexing may be used; and/or a per-UE carrier bandwidth of 180 kHz may be used, according to some embodiments. As further possible example radio access network (RAN)/evolved packet core (EPC) features, NB-IoT carriers may include mandatory data over non-access stratum (DoNAS) support, optional radio resource control (RRC) suspend/resume support, eDRX support, and multi-physical resource block (PRB) support, according to some embodiments. Frequency hopping features for D2D communications may be supported. In some instances, NB-IoT carriers may provide coverage enhancement features for supporting coverage up to 20 dB.

Off Grid Radio Service (OGRS) is a system that may provide long range P2P/D2D communication (e.g., in absence of a wide area network (WAN) or WLAN radio connection) to support a variety of possible features. For example, as one possibility, OGRS service may be used by wireless devices by messaging applications (e.g., for exchanging text messages, voice/audio clips, etc.) and/or other types of applications for device-to-device long range communication without requiring network infrastructure or Internet connectivity. At least according to some embodiments, OGRS systems may support some or all of the features previously described herein, such as any of the features or steps of the methods of FIGS. 5-7.

According to some embodiments, OGRS may operate in unlicensed low ISM bands (e.g., between 700 MHz and 1 GHz (or higher)), for extended range purposes, and may use one or multiple carriers of approximately 200 kHz to 500 kHz (e.g., depending on regulatory requirements). OGRS may be designed to meet the local spectrum regulatory requirements, such as channel duty cycle, operating frequencies, hopping pattern, LBT, maximum transmit power, and occupied bandwidth.

Figure 9:
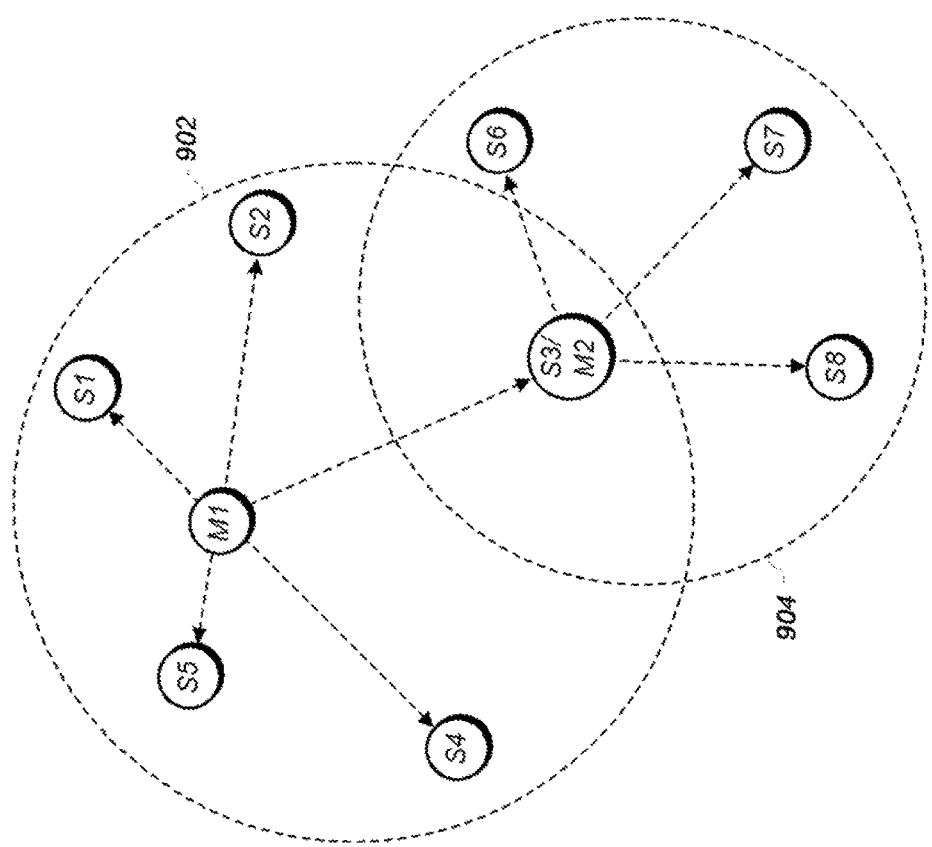
FIG. 9 illustrates aspects of an exemplary communication system, according to some embodiments.

FIG. 9 illustrates aspects of an exemplary possible OGRS communication system, according to some embodiments. As shown, the system may include a first OGRS group 902 and a second OGRS group 904. In a given environment, an OGRS group may operate independently, or multiple OGRS groups may co-exist (e.g., as illustrated in FIG. 9). Each of the groups may have a group master and group members; for example, the first OGRS group 902 may include a 'master' M1 along with several 'slaves' S1, S2, S3, S4, S5. A master in a group may transmit synchronization channels to which other members in the group, and any devices that wish to join the group, may obtain synchronization. For example, the synchronization channel(s) may assist with bringing all the members in the group to a common time and/or frequency, and may be helpful for the nodes in the group for later communication.

Synchronization can be extended when a particular node in the group is below a threshold (e.g., to facilitate the discovery and serving of new nodes that are beyond the current group's range). For example, node S3 in the first OGRS group 902 may (e.g., based on distance from M1) determine to establish the second OGRS group 904 and may act as the master M2 for the second OGRS group 904, which may be joined by nodes S6, S7, S8, as shown.

According to some embodiments, OGRS service may support relatively low throughput (e.g., from 0.5 to 30 kbps, as one possibility) between users. At least in some instances, it may be desirable for OGRS service to allow users to efficiently and securely perform discovery and authentication of contacts, and to establish a secured and encrypted peer-to-peer communication link.

Figure 10:
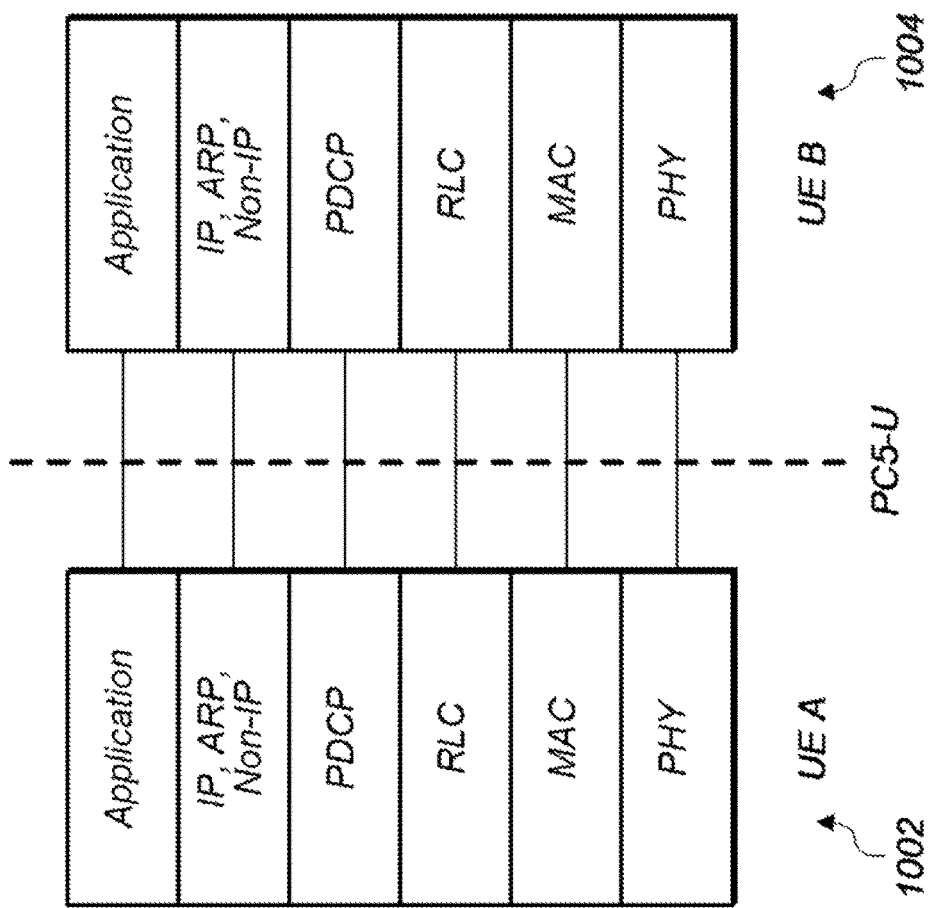
FIG. 10 illustrates aspects of exemplary possible protocol stacks for wireless devices performing device-to-device wireless communications, according to some embodiments.

FIG. 10 illustrates aspects of exemplary possible protocol stacks for wireless devices performing device-to-device wireless communications, according to some embodiments. Note that other protocol stacks (e.g., including variations on the illustrated protocol stacks and/or alternatives to the illustrated protocol stacks) are also possible. As shown, each of various protocol layers of UE A 1002 and UE B 1004, including application, IP/ARP/non-IP, PDCP, RLC, MAC, and PHY, may be capable of exchanging signaling/communication (e.g., over-the-air, by way of a physical air interface between the devices).

Accordingly, it may be possible to identify users and authenticate them at multiple layers (e.g., using a protocol layer in the D2D protocol stack, such as the PDCP/NAS security over MAC layer, and also using a protocol layer in a higher layer of the protocol stack, such as the application layer). This may include generating and transmitting more (e.g., approximately twice as much, in some instances) signaling over the air than necessary to perform the desired functions. Similarly, at least in some instances, D2D security and encrypting mechanisms may exist, but also different and potentially duplicative encryption mechanisms may be used at higher layers. Further, layer 3 messages and D2D state machine maintenance may potentially effectively duplicate higher layer TCP and/or application layer session management, according to some embodiments. Still further, in some instances application layer discovery software/toolkits, which could be used for certain discovery features, may include substantial overhead for features that are not needed for D2D communication, while the needed functionality (e.g., exchange of IPv6 addresses) could be achieved more efficiently through dedicated exchange of messages at a lower layer (e.g., a D2D MAC layer). Because OGRS may utilize relatively little bandwidth and provide relatively little throughput, it may be correspondingly more useful to avoid such duplication between D2D modem protocol layers and higher layer functionality and otherwise avoid extraneous signaling such that the same functionality can be provided with a reduced over-the-air signaling overhead.

Additionally, at least according to some embodiments, OGRS may leverage a D2D based protocol in which there are no RLC ACK/NACKs, no HARQ ACK/NACKs, and no radio link monitoring. This may create difficulty for the resource allocation algorithm of the OGRS MAC layer to understand the state of the spectrum, the ratio of good vs. bad decoded packets, and/or other aspects of link quality.

Further, without such information, it may be difficult for the D2D modem to identify a situation in which the OGRS spectrum is in a congested state (e.g., such that it may be beneficial for OGRS devices to back-off their use of the spectrum, utilize rate adaptation, and/or reduce the rate of accessing radio resource pools over the air). In other words, if the OGRS modem does not have a way to monitor the OGRS link status, it may be impossible to adapt a wireless device's quality of services to the state of the spectrum.

Figure 11:
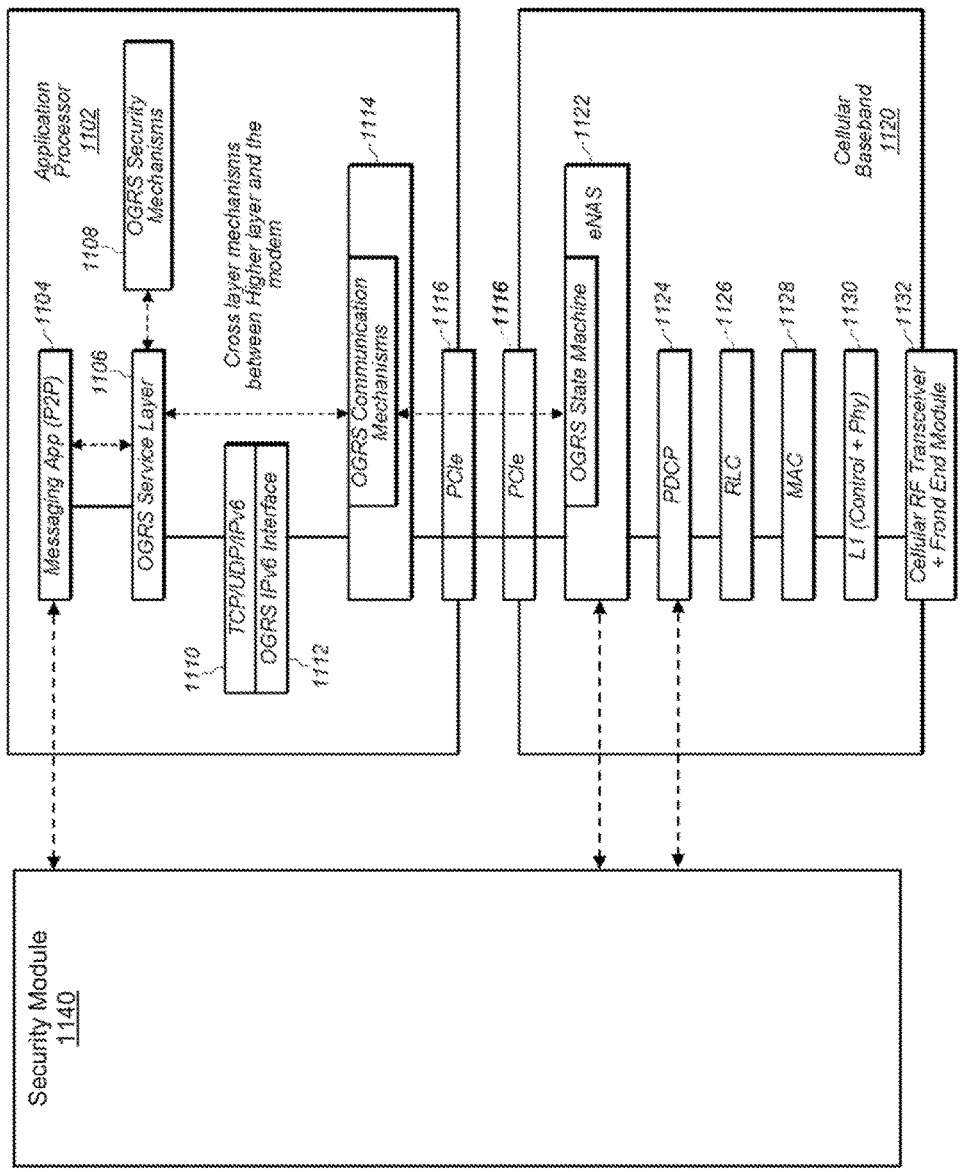
FIG. 11 illustrates aspects of an exemplary wireless device configured to enable secure authentication identification in conjunction with device-to-device wireless communications, according to some embodiments.

FIG. 11 illustrates aspects of an exemplary wireless device 1100 configured to be used in conjunction with OGRS communication (e.g., wireless devices 106A, 106B, and 107), according to some embodiments. The exemplary wireless device illustrated may include two processing domains: an application processor 1102 domain and a baseband processor 1120 domain, as well as a security module 1140. The application processor 1102 may support a messaging application 1104, which may be capable of utilizing P2P communication capability of the wireless device. The messaging app 1104 may interface with an OGRS service layer 1106, which may utilize OGRS security mechanisms 1108. The application processor 1102 may further support TCP/UDP/IPv6 functionality 1110, including an OGRS IPv6 interface 1112. Additionally, the application processor 1102 may support OGRS communication mechanisms 1114, which may facilitate cross-layer communication between the application processor 1102 domain protocol layers and the baseband processor 1120 domain protocol layers. An HSIC or PCIe interface 1116 may provide a physical and logical interface between the processing domains.

The baseband processor 1120 may support an eNAS layer 1122, which may include OGRS state machine functionality. Additionally, the baseband processor may support a PDCP layer 1124, a RLC layer 1126, a MAC layer 1128, and a L1 (control and PHY) layer 1130. The L1 layer 1130 may interface with the Physical layer/DSP and/or cellular RF transceiver and front end module 1132 that may generate and transmit waveforms for over-the-air transmission.

One way to reduce the protocol overhead over-the-air using such a framework (or another framework capable of supporting such cross functional signaling) may include eliminating the D2D protocol signaling generated in the modem to maintain and establish an OGRS session status in the baseband. It may further be possible to eliminate the security protocol in the D2D protocol stack using such a framework.

For example, upper layer (e.g., TCP and application layer) signaling may be used to maintain and establish an OGRS session on the application processor side and also on the modem side. When a user starts an OGRS session, application layer messages over TCP may be used to create a session, add a user, remove a user, or stop OGRS service. High layer authentication and encryption mechanisms may be used. In order to maintain the session and state machine in the modem, signaling capability (e.g., such as illustrated in FIG. 11) between the application layer and the D2D protocol stack may be used. Thus, when the OGRS session is created or modified at the application layer, an indication may be sent to the modem protocol stack. Additionally, keep-alive messages for the session may be exchanged at the TCP layer, and the resulting session status may also be indicated to the modem D2D protocol stack. Vice versa may be true for identification authentication.

As previously noted, when OGRS service starts in two devices wishing to communicate with each other, the two devices may perform discovery to discover each other. The devices may further perform authentication, and assign auto configuration IPv6 addresses. In order to retrieve the IPv6 address of each device, the IPv6 layer in the application processor domain may send each device's IPv6 address to its modem. Each device's OGRS modem protocol stack may send the IPv6 address of that device with the PHY ID to the other device, and upon receiving the other device's IPv6 address, may provide that to the device's IPv6 layer. This may complete OGRS discovery such that IPv6 addresses may be shared without the need for exchanging signaling associated with higher layers over-the-air.

Figure 12:
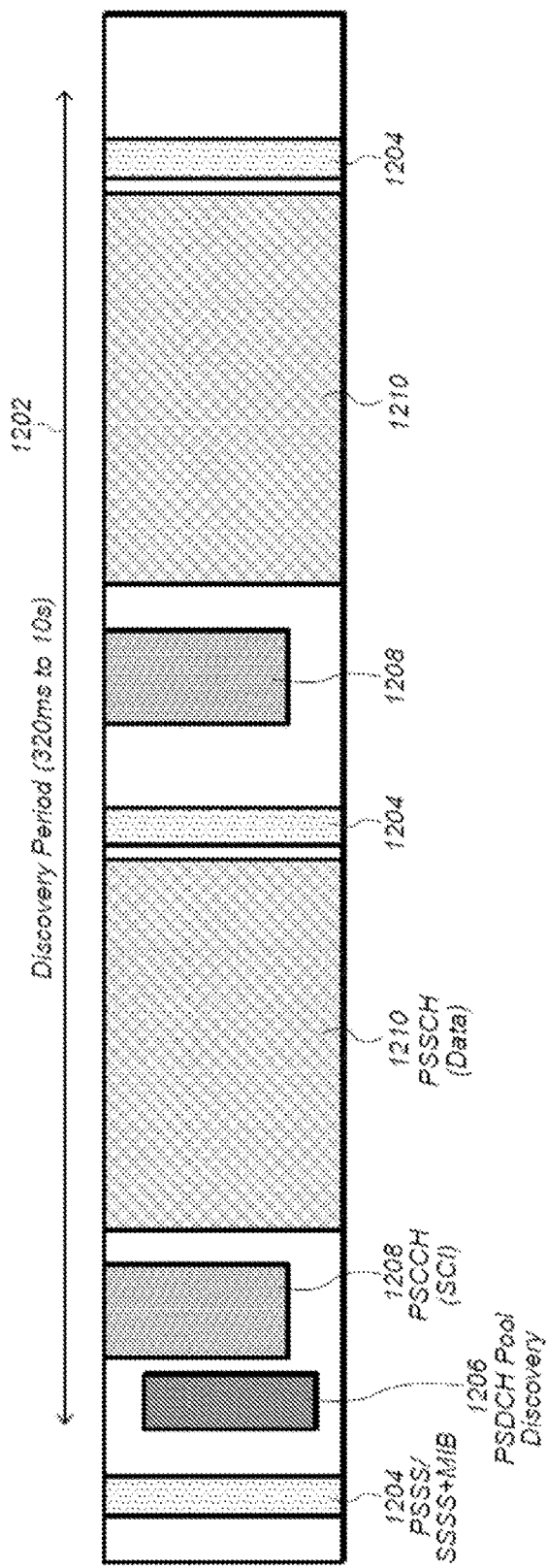
FIG. 12 illustrates an exemplary set of possible discovery and communication pools, according to some embodiments.

As further previously noted, at least according to some embodiments, it may be desirable for the OGRS modem to perform link adaptation for an OGRS link (e.g., including adjusting the transmission Quality of Service (QoS) based on the link quality and level of interference and frequency of collisions). One way to adjust the QoS in OGRS may include incorporating link quality information into the MAC algorithm used to select D2D discovery and communication pools. For example, FIG. 12 illustrates an exemplary set of possible OGRS discovery and communication pools, according to some embodiments, among which a wireless device could select a next discovery and/or data communication opportunity based at least in part on its estimation of the link quality, interference levels, and/or congestions levels.

As shown, according to the illustrated timeline synchronization signals (e.g., primary sidelink synchronization signals (PSSS), secondary sidelink synchronization signals (SSSS), and a master information block (MIB)) 1204 may be transmitted periodically (e.g., by a OGRS group master device). Certain resources in the communication channel used by the OGRS group may be set aside for a physical sidelink discovery channel (PSDCH) 1206 (e.g., a pool of discovery resources), for a physical sidelink control channel (PSCCH) 1208 (e.g., for communicating sidelink control information (SCI)), and for a physical sidelink shared channel (PSDCH) 1210 (e.g., a pool of data communication resources).

As one possibility, a wireless device may adjust its access rate to the available resource pools based on the success rate of transmissions to and/or from the wireless device. This may facilitate the wireless device being able to be aggressive in accessing resources in a non-congested environment (e.g., potentially leading to better user experience), and to reduce the access to radio resources in a congested environment (e.g., potentially reducing the amount of interference caused and the likelihood of collisions).

Since OGRS D2D may not support RLC mechanisms for OGRS link assessment (or even if such mechanisms are supported), it may be useful to gather data/statistics that can support such link adaptation at higher layers (e.g., in the application processor domain). For example, a software component may gather TCP ACK/NACK rate and statistics, a TCP congestion window size, and/or an application layer end-to-end transmission delay. Based on these statistics, the software component could provide a (e.g., real time) assessment of the current OGRS link performance, and/or could provide such information to the D2D modem to generate its own assessment of the current OGRS link performance. To support provision of such information, an interface for communicating information between this software component (e.g., in the application processor domain) and the MAC layer of the D2D modem may be provided, and may be used to update the MAC layer with the status of the OGRS link (e.g., at regular intervals, upon receiving a request for an update from the MAC layer, and/or based on any of various other possible triggers). The D2D MAC layer may then use this information to update (e.g., in real time) the algorithm used to calculate the next radio opportunity for the wireless device to use for discovery and/or data communication messages. In some instances (e.g., in case of very high congestion), the D2D MAC layer may also or alternatively use this information to determine to change the operating channel for the OGRS link.

Another exemplary embodiment may include a wireless device, including, for example: an antenna; a radio coupled to the antenna; and a processing element operably coupled to the radio, wherein the device is configured to implement any or all parts of the preceding examples.

A further exemplary set of embodiments may include a non-transitory computer accessible memory medium including, for example, program instructions which, when executed at a device, cause the device to implement any or all parts of any of the preceding examples.

A still further exemplary set of embodiments may include a computer program including, for example, instructions for performing any or all parts of any of the preceding examples.

Yet another exemplary set of embodiments may include an apparatus including, for example, means for performing any or all of the elements of any of the preceding examples.

Further Description of FIGS. 1-12

In addition to the above-described exemplary embodiments, further embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method (e.g., any of the method embodiments described herein, or, any combination of the method embodiments described herein, or, any subset of any of the method embodiments described herein, or, any combination of such subsets).

In some embodiments, a device (e.g., a UE 106 or 107) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

One, some, or all of the processes described with respect to FIGS. 1-12 may each be implemented by software, but may also be implemented in hardware, firmware, or any combination of software, hardware, and firmware. Instructions for performing these processes may also be embodied as machine- or computer-readable code recorded on a machine- or computer-readable medium. In some embodiments, the computer-readable medium may be a non-transitory computer-readable medium. Examples of such a non-transitory computer-readable medium include but are not limited to a read-only memory, a random-access memory, a flash memory, a CD-ROM, a DVD, a magnetic tape, a removable memory card, and a data storage device. In other embodiments, the computer-readable medium may be a transitory computer-readable medium. In such embodiments, the transitory computer-readable medium can be distributed over network-coupled computer systems so that the computer-readable code is stored and executed in a distributed fashion. For example, such a transitory computer-readable medium may be communicated from one electronic device or subsystem to another electronic device or subsystem using any suitable communications protocol (e.g., the computer-readable medium may be communicated. Such a transitory computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is understood that any, each, or at least one module or component or subsystem may be provided as a software construct, firmware construct, one or more hardware components, or a combination thereof. For example, any, each, or at least one module or component or subsystem may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules and components and subsystems are only illustrative, and that the number, configuration, functionality, and interconnection of existing modules, components, and/or subsystems may be modified or omitted, additional modules, components, and/or subsystems may be added, and the interconnection of certain modules, components, and/or subsystems may be altered.

Any or each module or component may be a dedicated system implemented using one or more expansion cards adapted for various bus standards. For example, all of the modules may be mounted on different interconnected expansion cards or all of the modules may be mounted on one expansion card. Any or each module or component may include its own processing circuitry and/or memory. Alternatively, any or each module or component may share processing circuitry and/or memory with any other module.

While there have been described systems, methods, and computer-readable media for securely authenticating device identification and/or user identification for low throughput device-to-device wireless communication, it is to be understood that many changes may be made therein without departing from the spirit and scope of the subject matter described herein in any way. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

Therefore, those skilled in the art will appreciate that the invention can be practiced by other than the described embodiments, which are presented for purposes of illustration rather than of limitation. Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method of securing device authentication for communication between a first electronic device and a second electronic device, the method comprising:
   pairing the first electronic device and the second electronic device for a pairing session of a limited duration, wherein the pairing comprises enabling a shared secret between the first electronic device and the second electronic device for only the limited duration of the pairing session;
   time synchronizing the first electronic device and the second electronic device for at least the limited duration of the pairing session; and
   after the pairing and the time synchronizing but only during the limited duration of the pairing session:
      generating, at the first electronic device, an identification discovery advertisement using the shared secret;
      transmitting, from the first electronic device, the identification discovery advertisement;
      receiving, at the second electronic device, the identification discovery advertisement; and
      authenticating, at the second electronic device, the identification discovery advertisement using the shared secret, wherein:
         the enabling the shared secret between the first electronic device and the second electronic device for the pairing session comprises:
            making a first session identity key available to the first electronic device that is associated with the identity of the first electronic device; and
            making a second session identity key available to the second electronic device that is associated with the identity of the first electronic device; and
         the first session identity key is identical to the second session identity key.

2. The method of claim 1, further comprising, after the authenticating, using at least a portion of the identification discovery advertisement as at least a portion of a media access control address for a data communication between the first electronic device and the second electronic device during the limited duration of the pairing session.

3. The method of claim 1, wherein the identification discovery advertisement comprises no more than 4 bytes of data.

4. A method of securing device authentication for communication between a first electronic device and a second electronic device, the method comprising:
   pairing the first electronic device and the second electronic device for a pairing session of a limited duration, wherein the pairing comprises enabling a shared secret between the first electronic device and the second electronic device for the pairing session;
   time synchronizing the first electronic device and the second electronic device for at least the limited duration of the pairing session; and
   during the limited duration of the pairing session:
      generating, at the first electronic device, an identification discovery advertisement using the shared secret;
      transmitting, from the first electronic device, the identification discovery advertisement;

receiving, at the second electronic device, the identification discovery advertisement; and authenticating, at the second electronic device, the identification discovery advertisement using the shared secret, wherein:

the enabling the shared secret between the first electronic device and the second electronic device for the pairing session comprises:

making a first session identity key available to the first electronic device that is associated with the identity of the first electronic device; and making a second session identity key available to the second electronic device that is associated with the identity of the first electronic device;

the first session identity key is identical to the second session identity key;

the limited duration of the pairing session comprises a plurality of distinct rotation sessions; and the generating comprises:

defining a plurality of rotation session identity keys using the first session identity key, wherein each rotation session identity key is associated with only a respective one of the plurality of rotation sessions;

at a current time of the generating, identifying a rotation session of the plurality of rotation sessions that is associated with the current time of the generating;

identifying the rotation session identity key associated with the identified rotation session that is associated with the current time of the generating; and using the identified rotation session identity key to define the identification discovery advertisement.

5. The method of claim 4, wherein:
the authenticating the identification discovery advertisement comprises using the second session identity key.

6. The method of claim 4, wherein the generating the identification discovery advertisement further comprises:

obtaining a random value;

encrypting at least a portion of the identified rotation session identity key using the obtained random value to provide an encrypted key; and defining the identification discovery advertisement to comprise the obtained random value and the encrypted key.

7. The method of claim 4, wherein the authenticating comprises:

defining another plurality of other rotation session identity keys using the second session identity key, wherein each other rotation session identity key is associated with only a respective one of the plurality of rotation sessions;

at a current time of the authenticating, identifying a rotation session of the plurality of rotation sessions that is associated with the current time of the authenticating;

identifying the other rotation session identity key associated with the identified rotation session that is associated with the current time of the authenticating; and using the identified other rotation session identity key to validate the identification discovery advertisement.

8. The method of claim 7, wherein:
the generating the identification discovery advertisement further comprises:

obtaining a random value;

encrypting at least a portion of the identified rotation session identity key using the obtained random value to provide an encrypted key; and defining the identification discovery advertisement to comprise the obtained random value and the encrypted key; and the authenticating the identification discovery advertisement comprises:

obtaining the random value from the identification discovery advertisement;

encrypting at least a portion of the identified other rotation session identity key using the obtained random value to provide another encrypted key; and validating the identification discovery advertisement when the other encrypted key matches the encrypted key from the identification discovery advertisement.

9. The method of claim 8, wherein the encrypting of the generating and the encrypting of the authenticating use a common cryptographic hash function.

10. The method of claim 9, wherein the common cryptographic hash function is determined at each one of the first and second electronic devices during the pairing.

11. The method of claim 7, wherein the defining the plurality of rotation session identity keys and the defining the other plurality of other rotation session identity keys use a common key derivation function.

12. The method of claim 4, further comprising, after the authenticating, using at least a portion of the identification discovery advertisement as at least a portion of a media access control address for a data communication between the first electronic device and the second electronic device during the limited duration of the pairing session.

13. The method of claim 4, wherein the identification discovery advertisement comprises no more than 4 bytes of data.

14. A method of securing device authentication for communication between a first electronic device and a second electronic device, the method comprising:

pairing the first electronic device and the second electronic device for a pairing session of a limited duration, wherein the pairing comprises enabling a shared secret between the first electronic device and the second electronic device for the pairing session;

time synchronizing the first electronic device and the second electronic device for at least the limited duration of the pairing session; and during the limited duration of the pairing session:

generating, at the first electronic device, an identification discovery advertisement using the shared secret;

transmitting, from the first electronic device, the identification discovery advertisement;

receiving, at the second electronic device, the identification discovery advertisement; and authenticating, at the second electronic device, the identification discovery advertisement using the shared secret, wherein:

the enabling the shared secret between the first electronic device and the second electronic device for the pairing session comprises:

making a first session identity key available to the first electronic device that is associated with the identity of the first electronic device; and making a second session identity key available to the second electronic device that is associated with the identity of the first electronic device;

the first session identity key is identical to the second session identity key;

the enabling the shared secret between the first electronic device and the second electronic device for the pairing session further comprises:
   making a third session identity key available to the first electronic device that is associated with the identity of the second electronic device; and
   making a fourth session identity key available to the second electronic device that is associated with the identity of the second electronic device; and
the third session identity key is identical to the fourth session identity key.

15. The method of claim 14, further comprising:
during the limited duration of the pairing session:
   generating, at the second electronic device, another identification discovery advertisement using the shared secret;
   transmitting, from the second electronic device, the other identification discovery advertisement;
   receiving, at the first electronic device, the other identification discovery advertisement; and
   authenticating, at the first electronic device, the other identification discovery advertisement using the shared secret.

16. The method of claim 15, wherein:
the generating the other identification discovery advertisement comprises using the fourth session identity key; and
the authenticating the other identification discovery advertisement comprises using the third session identity key.

17. The method of claim 16, wherein the third session identity key is different than the first session identity key.

18. The method of claim 17, further comprising, after the authenticating the other identification discovery advertisement, using at least a portion of the other identification discovery advertisement as at least a portion of a media access control address for a data communication between the first electronic device and the second electronic device during the limited duration of the pairing session.

19. The method of claim 17, further comprising, once each one of the identification discovery advertisement and the other identification discovery advertisement has been authenticated, using at least a portion of the identification discovery advertisement and at least a portion of the other identification discovery advertisement as at least a portion of a media access control address for a data communication between the first electronic device and the second electronic device during the limited duration of the pairing session.

20. The method of claim 14, further comprising, after the authenticating, using at least a portion of the identification discovery advertisement as at least a portion of a media access control address for a data communication between the first electronic device and the second electronic device during the limited duration of the pairing session.

21. The method of claim 14, wherein the identification discovery advertisement comprises no more than 4 bytes of data.

22. A method of securing device authentication for communication between a first electronic device and a second electronic device, the method comprising:
pairing the first electronic device with the second electronic device for a pairing session of a limited duration, wherein the pairing comprises enabling a shared secret between the first electronic device and the second electronic device for the pairing session;
time synchronizing the first electronic device with the second electronic device; and
during the limited duration of the pairing session:
   generating, at the first electronic device, an identification discovery advertisement using the shared secret; and
   transmitting, from the first electronic device, the identification discovery advertisement, wherein the generating the identification discovery advertisement comprises:
      identifying a key of the shared secret that is only viable for a finite period of time of the limited duration;
      obtaining a random value;
      creating a message using a cryptographic hash function on the obtained random value and the identified key; and
      defining the identification discovery advertisement to comprise the obtained random value and at least a portion of the created message.

23. The method of claim 22, wherein the defining comprises defining the identification discovery advertisement to comprise the obtained random value and only a portion of the created message.

24. The method of claim 22, further comprising:
receiving, at the first electronic device from the second electronic device, another identification discovery advertisement during the limited duration of the pairing session;
authenticating, at the first electronic device, the other identification discovery advertisement using the shared secret; and
using at least a portion of the identification discovery advertisement and at least a portion of the other identification discovery advertisement as at least a portion of a media access control address for a data communication between the first electronic device and the second electronic device during the limited duration of the pairing session.

25. A method of securing device authentication for communication between a first electronic device and a second electronic device, the method comprising:
pairing the first electronic device with the second electronic device for a pairing session of a limited duration, wherein the pairing comprises enabling a shared secret between the first electronic device and the second electronic device for the pairing session;
time synchronizing the second electronic device with the first electronic device; and
during the limited duration of the pairing session:
   receiving, at the second electronic device, an identification discovery advertisement comprising a random value and a message; and
   authenticating, at the second electronic device, the identification discovery advertisement using the shared secret, wherein the authenticating the identification discovery advertisement comprises:
      identifying a key of the shared secret that is only viable for a finite period of time of the limited duration;
      obtaining the random value from the identification discovery advertisement;
      creating another message using a cryptographic hash function on the obtained random value and the identified key; and validating the identification discovery advertisement when at least a portion of the other message matches the message from the identification discovery advertisement.

26. The method of claim 25, wherein the validating comprises validating the identification discovery advertisement when only a portion of the other message matches the message from the identification discovery advertisement.

27. The method of claim 25, further comprising:
generating, at the second electronic device, another identification discovery advertisement using the shared secret during the limited duration of the pairing session; and transmitting, from the second electronic device, the other identification discovery advertisement; and using at least a portion of the identification discovery advertisement and at least a portion of the other identification discovery advertisement as at least a portion of a media access control address for a data communication between the first electronic device and the second electronic device during the limited duration of the pairing session.

* * * * *